(12) United States Patent
Hashiguchi et al.

(10) Patent No.: US 11,005,369 B2
(45) Date of Patent: May 11, 2021

(54) SWITCHING REGULATOR AND INTEGRATED CIRCUIT PACKAGE

(71) Applicant: Rohm Co., Ltd., Kyoto (JP)

(72) Inventors: Shingo Hashiguchi, Kyoto (JP); Tetsuo Tateishi, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 276 days.

(21) Appl. No.: 16/323,853

(22) PCT Filed: Aug. 2, 2017

(86) PCT No.: PCT/JP2017/028006
§ 371 (c)(1),
(2) Date: Feb. 7, 2019

(87) PCT Pub. No.: WO2018/030230
PCT Pub. Date: Feb. 15, 2018

(65) Prior Publication Data
US 2019/0214911 A1    Jul. 11, 2019

(30) Foreign Application Priority Data

Aug. 10, 2016 (JP) .............................. JP2016-157362
Aug. 10, 2016 (JP) .............................. JP2016-157364

(51) Int. Cl.
*H02M 3/158* (2006.01)
*H02M 3/155* (2006.01)
*B60R 16/033* (2006.01)

(52) U.S. Cl.
CPC ......... *H02M 3/1582* (2013.01); *B60R 16/033* (2013.01); *H02M 3/155* (2013.01)

(58) Field of Classification Search
CPC .... H02M 3/1582; H02M 3/155; B60R 16/033
See application file for complete search history.

(56) References Cited

U.S. PATENT DOCUMENTS 5,563,496 A * 10/1996 McClure ................. H02J 7/022
320/128
6,977,488 B1   12/2005 Nogawa et al.
(Continued)

FOREIGN PATENT DOCUMENTS

| JP | 3556652 B | 5/2004 |
| JP | 2007-134119 | 5/2007 |

(Continued)

OTHER PUBLICATIONS

Japan Patent Office, International Search Report for PCT/JP2017/028006 dated Aug. 29, 2017 (with English translation).
(Continued)

*Primary Examiner* — Pinping Sun
(74) *Attorney, Agent, or Firm* — Fish & Richardson P.C.

(57) ABSTRACT

Provided is an integrated circuit package which complementarily switches on/off a MOS transistor Q1 (first switch) and MOS transistor Q2 (second switch) in accordance with an output voltage Vout, and which externally outputs a pulse signal having a fixed on-duty D during a step-up/step-down mode. The integrated circuit package has a determination unit 61 for determining the impedance of an external component connected to an external pin P5 that outputs the pulse signal to the exterior during the step-up/step-down mode, and determining whether the external component is a third switch on the basis of the impedance determination result.

15 Claims, 20 Drawing Sheets

(56) References Cited

U.S. PATENT DOCUMENTS

| | | | | |
|---|---|---|---|---|
| 8,552,702 | B2* | 10/2013 | Sasaki | G05F 1/10 |
| | | | | 323/283 |
| 9,960,682 | B2* | 5/2018 | Yu | H02M 3/1588 |
| 2008/0048631 | A1* | 2/2008 | Kim | H02M 3/157 |
| | | | | 323/283 |
| 2009/0262556 | A1* | 10/2009 | Tomiyoshi | H02M 3/1588 |
| | | | | 363/17 |
| 2010/0293302 | A1 | 11/2010 | Fujii et al. | |
| 2013/0320949 | A1 | 12/2013 | Prexl et al. | |
| 2014/0153197 | A1 | 6/2014 | Yen | |
| 2014/0232360 | A1* | 8/2014 | Dally | G05F 1/563 |
| | | | | 323/266 |
| 2015/0054478 | A1 | 2/2015 | Prexl et al. | |

FOREIGN PATENT DOCUMENTS

| | | | |
|---|---|---|---|
| JP | 2010-267221 | | 11/2010 |
| JP | 2015-047040 | | 3/2015 |
| JP | 2015047040 | A * | 3/2015 |
| WO | 2017/002834 | | 1/2017 |

OTHER PUBLICATIONS

U.S. Appl. No. 10/218,269, filed Feb. 26, 2019, Yamaguchi et al.

* cited by examiner

SWITCHING REGULATOR AND INTEGRATED CIRCUIT PACKAGE

TECHNICAL FIELD

The present invention relates to step-up/down switching regulators, and to integrated circuit packages that can be used as one component of step-up/down switching regulators.

BACKGROUND ART

In idling-stop vehicles, where the engine is restarted frequently, in periods in which the engine is halted temporarily, vehicle-mounted equipment such as audio-visual equipment and air-conditioning equipment continues consuming electric power from the battery; thus, the drop in the battery voltage at the time of cranking (starting of the engine) is severer than ever. Using a step-up/down switching regulator that holds the output voltage against a drop in the input voltage (battery voltage) makes it possible to operate vehicle-mounted equipment normally even with a large drop in the battery voltage at the time of cranking.

Accordingly, the market of vehicle-mounted equipment is seeing increasing demand for step-up/down switching regulators.

Now, the configuration and operation of a common step-up/down switching regulator will be described. FIG. 23 is a diagram showing the configuration of a common step-up/down switching regulator.

The step-up/down switching regulator shown in FIG. 23 includes MOS transistors Q11 and Q12 acting as step-down switches, an inductor L11, MOS transistors Q13 and Q14 acting as step-up switches, an output capacitor C11, resistors R11 to R14, and a controller CNT11.

The controller CNT11 monitors an output voltage $V_{OUT}$ based on the output of a voltage division circuit composed of the resistors R11 and R12, and monitors a battery voltage $V_{BAT}$, that is, an input voltage, based on the output of a voltage division circuit composed of the resistors R13 and R14.

When the battery voltage $V_{BAT}$ is higher than a first predetermined value A1, the controller CNT11 selects a step-down mode (see FIG. 24). In the step-down mode, the controller CNT11 turns on and off the MOS transistors Q11 and Q12 in accordance with the output voltage $V_{OUT}$, keeps the MOS transistor Q13 off, and keeps the MOS transistors Q14 on. Thus, a first switching voltage $V_{SW1}$, which is the voltage at the connection node between the transistors Q11 and Q12, and a second switching voltage $V_{SW2}$, which is the voltage at the connection node between the transistors Q13 and Q14, behave as shown in FIG. 25A.

When the battery voltage $V_{BAT}$ is equal to or lower than the first predetermined value A1 but higher than a second predetermined value A2, the controller CNT11 selects a step-up/down mode (see FIG. 24). In the step-up/down mode, the controller CNT11 turns on and off the MOS transistors Q13 and Q14 in accordance with the output voltage $V_{OUT}$, and turns on and off the MOS transistors Q11 and Q12 in accordance with the output voltage $V_{OUT}$. Thus, the first switching voltage $V_{SW1}$, which is the voltage at the connection node between the transistors Q11 and Q12, and the second switching voltage $V_{SW2}$, which is the voltage at the connection node between the transistors Q13 and Q14, behave as shown in FIG. 25B.

When the battery voltage $V_{BAT}$ is equal to or lower than the second predetermined value A2, the controller CNT11 selects a step-up mode (see FIG. 24). In the step-up mode, the controller CNT11 keeps the MOS transistor Q11 on, keeps the MOS transistor Q12 off, and turns on and off the transistors Q13 and Q14 in accordance with the output voltage $V_{OUT}$. Thus, the first switching voltage $V_{SW1}$, which is the voltage at the connection node between the transistors Q11 and Q12, and the second switching voltage $V_{SW2}$, which is the voltage at the connection node between the transistors Q13 and Q14, behave as shown in FIG. 25C.

LIST OF CITATIONS

Patent Literature

Patent Document 1: Japanese Patent registered as No. 3556652 (claim 7, FIG. 11)

SUMMARY OF THE INVENTION

Technical Problem

In the step-up/down and step-up modes in which stepping-up operation is performed through switching of the transistors Q13 and Q14, the transfer function H(s) of the PWM (pulse-width modulation) modulator composed of the transistors Q13 and Q14 in the step-up/down switching regulator shown in FIG. 23 includes a term T(s) given by formula (1) below.

[Formula 1]

$$T(s) = 1 - \frac{\alpha L \bar{I}_L}{(1-D)\bar{V}_{OUT}} s \quad (1)$$

where
$\bar{I}_L$ represents the average current in the reactor L11;
L represents the inductance value of the inductor L11;
$\bar{V}_{OUT}$ represents the average value of the output voltage $V_{OUT}$;
D represents the on-duty of the MOS transistor Q13; and
α represents the constant of proportionality.

The T(s) given by formula (1) above represents right-half-plane-zero characteristics (characteristics with a zero point on the right half plane), and the step-up/down switching regulator shown in FIG. 23 promises a satisfactory response only in a range lower than the frequency f given by formula (2) below. Formula (2) below results from substituting s=jω=j·2πf in formula (1) above.

[Formula 2]

$$f = \frac{1}{2\pi} \cdot \frac{(1-D)\bar{V}_{OUT}}{\alpha L \bar{I}_L} \quad (2)$$

One possible measure to improve response is to increase the capacitance of the output capacitor C11 in the step-up/down switching regulator shown in FIG. 23. Another possible measure is to provide a step-down switching regulator portion in a stage succeeding a step-up switching regulator portion.

Inconveniently, however, the former measure incurs an increased cost of the output capacitor C11; the latter measure requires separate reactors in the step-up and step-down switching regulator portions respectively, and incurs an increased cost of the reactors.

The DC-DC converter disclosed in Patent Document 1 can solve the above problem, indeed; however, since it is so configured that the duty of the first control signal generated by the feed-forward control circuit depends on the input voltage, if, due to the duty, the transfer function of the DC-DC converter varies linearly, inconveniently, this is difficult to compensate for.

On the other hand, when a step-up/down switching regulator is implemented in a single integrated circuit package, generally, one step-down switch is provided within the integrated circuit package, and a reactor and a pair of step-up switches are externally fitted in a stage succeeding the integrated circuit package. That is, as compared with a case where a step-down switching regulator is implemented in a single integrated circuit package, more components need to be externally fitted.

One possible measure to reduce the number of externally fitted components is to omit step-up switches and adopt a configuration as a step-down switching regulator, in which case an input capacitor has to be given a higher capacitance to suppress a drop in the input voltage to the integrated circuit package in case of a drop in the battery voltage $V_{BAT}$.

Against the background discussed above, a first object of the present invention is to provide a step-up/down switching regulator that, while suppressing an increase in costs, can be prevented from exhibiting right-half-plane-zero characteristics, offers response characteristics similar to step-down characteristics, and can suppress variation of the output voltage due to variation of the input voltage.

Against the background discussed above, a second object of the present invention is to provide a step-up/down switching regulator that, while suppressing an increase in costs, can be prevented from exhibiting right-half-plane-zero characteristics, offers response characteristics similar to step-down characteristics, and has step-down and step-up control signals with equivalent frequencies.

Against the background discussed above, a third object of the present invention is to provide an integrated circuit package that can be used as a component of a step-up/down switching regulator which, while suppressing an increase in costs, can be prevented from exhibiting right-half-plane-zero characteristics and which offers response characteristics similar to step-down characteristics, the integrated circuit package in addition permitting determination of whether it is being used as one component of the step-up/down switching regulator.

Against the background discussed above, a fourth object of the present invention is to provide an integrated circuit package that can be used as a component of a step-up/down switching regulator which, while suppressing an increase in costs, can be prevented from exhibiting right-half-plane-zero characteristics and which offers response characteristics similar to step-down characteristics, the integrated circuit package in addition being capable of supporting an added function of the step-up/down switching regulator.

It should be noted that the first to fourth objects overlap with each other in that they are all directed to providing a step-up/down switching regulator that can be prevented from exhibiting right-half-plane-zero characteristics and that offers response characteristics similar to step-down characteristics or an integrated circuit package that can be used as a component of such a step-up/down switching regulator. The present invention is intended to accomplish at least one of the first to fourth objects.

Means for Solving the Problem

<First Technical Feature>

Of the switching regulators disclosed herein, a switching regulator involving a first technical feature is one that generates an output voltage from an input voltage, and includes:

a first switch of which a first terminal is connected to an application terminal of the input voltage;

a second switch
  of which a first terminal is connected to a second terminal of the first switch and
  of which a second terminal is connected to an application terminal of a predetermined voltage lower than the input voltage;

an inductor of which a first terminal is connected to the connection node between the first and second switches;

a third switch
  of which a first terminal is connected to a second terminal of the inductor and
  of which a second terminal is connected to the application terminal of the predetermined voltage;

a fourth switch
  of which a first terminal is connected to the connection node between the inductor and the third switch and
  of which a second terminal is connected to an application terminal of the output voltage;

a first control circuit configured to generate a step-down control signal for turning on and off the first and second switches complementarily in accordance with the output voltage; and a second control circuit configured to generate a step-up control signal for turning on and off the third and fourth switches complementarily while keeping the on-duty D ($0 \leq D \leq 1$) of the third switch fixed at a fixed value D' ($0 < D' < 1$) in a step-up/down mode, wherein the first control circuit includes a ramp voltage generator configured to generate a ramp voltage with a gradient commensurate with the input voltage, and to generate the step-down control signal in accordance with the ramp voltage (Configuration 1-1).

In the switching regulator of Configuration 1-1 described above, preferably, the ramp voltage generator generates the ramp voltage with a gradient commensurate with the fixed value D' in the step-up/down mode (Configuration 1-2).

In the switching regulator of Configuration 1-1 or 1-2 described above, preferably, the first control circuit includes: an error amplifier that generates an error signal commensurate with a difference between a voltage commensurate with the output voltage and a reference voltage; a comparator that compares the ramp voltage with the error signal to generate a reset signal as a comparison signal; an oscillator that generates a set signal which is a clock signal with a predetermined frequency; and a timing control circuit configured to generate the step-down control signal in accordance with the set signal and the reset signal (Configuration 1-3).

In the switching regulator of Configuration 1-3 described above, preferably, the comparator applies to one of the ramp voltage and the error signal an offset commensurate with a current in the inductor (Configuration 1-4).

In the switching regulator of Configuration 1-3 or 1-4 described above, preferably, the predetermined frequency doe not depend on the input voltage, and
  the frequency of the ramp voltage is equal to the predetermined frequency (Configuration 1-5).

In the switching regulator of Configuration 1-5 described above, preferably, the first control circuit includes a detector configured to detect whether an external clock signal is being fed to an external clock signal input terminal, and when the detector detects an external clock signal being fed to the external clock signal input terminal, the oscillator varies the predetermined frequency in accordance with the frequency of the external clock signal (Configuration 1-6).

In the switching regulator of any of Configurations 1-1 to 1-6 described above, preferably,
the ramp voltage generator includes:
a current generator configured to generate a current commensurate with the input voltage; and
a capacitor that is charged by the output current of the current generator (Configuration 1-7).

In the switching regulator of Configuration 1-7 described above, preferably, the ramp voltage generator further includes a charge switch that switches between a conducting state and a cut-off state the current path from the output terminal of the current generator to the capacitor (Configuration 1-8).

In the switching regulator of Configuration 1-7 or 1-8 described above, preferably, the ramp voltage generator includes a resetter configured to discharge the capacitor to reset the charge voltage across the capacitor (Configuration 1-9).

Of the switching regulators disclosed herein, another switching regulator involving the first technical feature is one that generates an output voltage from an input voltage, and includes:
a first switch of which a first terminal is connected to an application terminal of the input voltage;
a second switch
of which a first terminal is connected to a second terminal of the first switch and
of which a second terminal is connected to an application terminal of a predetermined voltage lower than the input voltage;
an inductor of which a first terminal is connected to the connection node between the first and second switches;
a third switch
of which a first terminal is connected to a second terminal of the inductor and
of which a second terminal is connected to the application terminal of the predetermined voltage;
a fourth switch
of which a first terminal is connected to the connection node between the inductor and the third switch and
of which a second terminal is connected to an application terminal of the output voltage;
a first control circuit configured to generate a step-down control signal for turning on and off the first and second switches complementarily in accordance with the output voltage; and
a second control circuit configured to generate a step-up control signal for turning on and off the third and fourth switches complementarily while setting the on-duty of the third switch independently of either of the output voltage and the input voltage in a step-up/down mode, wherein
the first control circuit includes a ramp voltage generator configured to generate a ramp voltage with a gradient commensurate with the input voltage, and to generate the step-down control signal in accordance with the ramp voltage (Configuration 1-10).

Of the integrated circuit packages disclosed herein, an integrated circuit package involving the first technical feature includes:

a first external pin to which an input voltage is applied;
a second external pin to which a predetermined voltage lower than the input voltage is applied;
a third external pin to which a feedback voltage is applied,
a first switch of which a first terminal is connected to the first external pin;
a second switch
of which a first terminal is connected to a second terminal of the first switch and
of which a second terminal is connected to the second external pin;
a fourth external pin connected to the connection node between the first and second switches;
a first control circuit configured to generate a step-down control signal for turning on and off the first and second switches complementarily in accordance with the feedback voltage;
a second control circuit configured to generate a pulse signal of which the on-duty D ($0 \leq D \leq 1$) is fixed at a fixed value D' ($0 < D' < 1$) in a step-up/down mode; and
a fifth external pin from which the pulse signal is output in the step-up/down mode, wherein
the first control circuit includes a ramp voltage generator configured to generate a ramp voltage with a gradient commensurate with the input voltage, and to generate the step-down control signal in accordance with the ramp voltage (Configuration 1-11).

Of the vehicles disclosed herein, a vehicle involving the first technical feature includes: the switching regulator of any of Configurations 1-1 to 1-10 described above; and a battery that supplies the switching regulator with electric power (Configuration 1-12).

<Second Technical Feature>

Of the switching regulators disclosed herein, a switching regulator involving a second technical feature is one that generates an output voltage from an input voltage, and includes:
a first switch of which a first terminal is connected to an application terminal of the input voltage;
a second switch
of which a first terminal is connected to a second terminal of the first switch and
of which a second terminal is connected to an application terminal of a predetermined voltage lower than the input voltage;
an inductor of which a first terminal is connected to the connection node between the first and second switches;
a third switch
of which a first terminal is connected to a second terminal of the inductor and
of which a second terminal is connected to the application terminal of the predetermined voltage;
a fourth switch
of which a first terminal is connected to the connection node between the inductor and the third switch and
of which a second terminal is connected to an application terminal of the output voltage;
a first control circuit configured to generate a step-down control signal for turning on and off the first and second switches complementarily in accordance with the output voltage; and
a second control circuit configured to generate a step-up control signal for turning on and off the third and fourth switches complementarily while keeping the on-duty D ($0 \leq D \leq 1$) of the third switch fixed at a fixed value D' ($0 < D' < 1$) in a step-up/down mode, wherein the first and second control circuits each include a ramp voltage generator configured to generate a ramp voltage with a gradient commensurate with an internal supply voltage, the first control circuit includes a first comparator that compares a first division voltage of the internal supply voltage with the ramp voltage, the second control circuit includes a second comparator that compares a second division voltage of the internal supply voltage with the ramp voltage, the first control circuit generates the step-down control signal with a frequency equal to the frequency of the output signal of the first comparator; and the second control circuit takes the output signal of the second comparator as the step-up control signal (Configuration 2-1).

In the switching regulator of Configuration 2-1 described above, preferably, the second comparator includes a plurality of second comparators, and second division voltages of the internal supply voltage that are fed to the plurality of second comparators respectively have values different from each other (Configuration 2-2).

In the switching regulator of Configuration 2-1 or 2-2 described above, preferably, the ramp voltage generator includes:
a current generator configured to generate a current commensurate with the internal supply voltage; and
a capacitor that is charged by the output current of the current generator (Configuration 2-3).

In the switching regulator of Configuration 2-3 described above, preferably, the ramp voltage generator further includes a charge switch that switches between a conducting state and a cut-off state the current path from the output terminal of the current generator to the capacitor (Configuration 2-4).

In the switching regulator of Configuration 2-3 or 2-4 described above, preferably, the ramp voltage generator includes a resetter configured to discharge the capacitor to reset a charge voltage across the capacitor (Configuration 2-5).

Of the switching regulators disclosed herein, another switching regulator involving the second technical feature is one that generates an output voltage from an input voltage, and includes:

a first switch of which a first terminal is connected to an application terminal of the input voltage;

a second switch
of which a first terminal is connected to a second terminal of the first switch and
of which a second terminal is connected to an application terminal of a predetermined voltage lower than the input voltage;

an inductor of which a first terminal is connected to the connection node between the first and second switches;

a third switch
of which a first terminal is connected to a second terminal of the inductor and
of which a second terminal is connected to the application terminal of the predetermined voltage;

a fourth switch
of which a first terminal is connected to the connection node between the inductor and the third switch and
of which a second terminal is connected to an application terminal of the output voltage;

a first control circuit configured to generate a step-down control signal for turning on and off the first and second switches complementarily in accordance with the output voltage; and a second control circuit configured to generate a step-up control signal for turning on and off the third and fourth switches complementarily while setting the on-duty of the third switch independently of either of the output voltage and the input voltage in a step-up/down mode, wherein the first and second control circuits each include a ramp voltage generator configured to generate a ramp voltage with a gradient commensurate with an internal supply voltage, the first control circuit includes a first comparator that compares a first division voltage of the internal supply voltage with the ramp voltage, the second control circuit includes a second comparator that compares a second division voltage of the internal supply voltage with the ramp voltage, the first control circuit generates the step-down control signal with a frequency equal to the frequency of the output signal of the first comparator; and the second control circuit takes the output signal of the second comparator as the step-up control signal (Configuration 2-6).

Of the integrated circuit packages disclosed herein, an integrated circuit package involving the second technical feature includes:

a first external pin to which an input voltage is applied;
a second external pin to which a predetermined voltage lower than the input voltage is applied;
a third external pin to which a feedback voltage is applied,
a first switch of which a first terminal is connected to the first external pin;
a second switch
of which a first terminal is connected to a second terminal of the first switch and
of which a second terminal is connected to the second external pin;
a fourth external pin connected to the connection node between the first and second switches;
a first control circuit configured to generate a step-down control signal for turning on and off the first and second switches complementarily in accordance with the feedback voltage;
a second control circuit configured to generate a pulse signal of which the on-duty D ($0 \leq D \leq 1$) is fixed at a fixed value D' ($0 < D' < 1$) in a step-up/down mode; and
a fifth external pin from which the pulse signal is output in the step-up/down mode,
wherein
the first and second control circuits each include a ramp voltage generator configured to generate a ramp voltage with a gradient commensurate with an internal supply voltage,
the first control circuit includes a first comparator that compares a first division voltage of the internal supply voltage with the ramp voltage,
the second control circuit includes a second comparator that compares a second division voltage of the internal supply voltage with the ramp voltage,
the first control circuit generates the step-down control signal with a frequency equal to the frequency of the output signal of the first comparator; and
the second control circuit takes the output signal of the second comparator as the pulse signal (Configuration 2-7).

Of the vehicles disclosed herein, a vehicle involving the second technical feature includes: the switching regulator of any of Configurations 2-1 to 2-6 described above; and a battery that supplies the switching regulator with electric power (Configuration 2-8).

<Third Technical Feature>

Of the integrated circuit packages disclosed herein, an integrated circuit package involving a third technical feature includes:
  a first external pin to which an input voltage is applied;
  a second external pin to which a predetermined voltage lower than the input voltage is applied;
  a third external pin to which a feedback voltage is applied,
  a first switch of which a first terminal is connected to the first external pin;
  a second switch
    of which a first terminal is connected to a second terminal of the first switch and
    of which a second terminal is connected to the second external pin;
  a fourth external pin connected to the connection node between the first and second switches;
  a first control circuit configured to generate a step-down control signal for turning on and off the first and second switches complementarily in accordance with the feedback voltage;
  a second control circuit configured to generate a pulse signal of which the on-duty D ($0 \leq D \leq 1$) is fixed at a fixed value D' ($0 < D' < 1$) in a step-up/down mode;
  a fifth external pin from which the pulse signal is output in the step-up/down mode; and
  a discriminator configured to determine the impedance of an external component connected to the fifth external pin and, based on the determined impedance, determine whether the external component is a third switch (Configuration 3-1).

In the integrated circuit package of Configuration 3-1 described above, preferably,
  at the start-up of the integrated circuit package,
  the discriminator determines whether the external component is the third switch, and
  on completion of the determination by the discriminator, the first control circuit starts to generate the step-down control signal (Configuration 3-2).

In the integrated circuit package of Configuration 3-1 or 3-2 described above, preferably,
  the second control circuit
  operates when the discriminator determines that the external component is the third switch and
  does not operate when the discriminator determines that the external component is not the third switch (Configuration 3-3).

In the integrated circuit package of Configuration 3-3 described above, preferably,
  the discriminator determines whether the fifth external pin is pulled up, and
  when the discriminator determines that the fifth external pin is pulled up, even if the discriminator determines that the external component is not the third switch, the second control circuit operates exceptionally (Configuration 3-4).

In the integrated circuit package of any of Configurations 3-2 to 3-4 described above, preferably,
  at the start-up of the integrated circuit package, when the discriminator determines that the external component is the third switch,
    if the input voltage is lower than a first threshold value, the operation of the first control circuit is inhibited, and
    if the input voltage is lower than a second threshold value larger than the first threshold value, the operation of the second control circuit is inhibited (Configuration 3-5).

In the integrated circuit package of any of Configurations 3-1 to 3-5 described above, preferably,
  during the period in which the discriminator is determining whether the external component is the third switch, the discriminator
    keeps the output level of the second control circuit indefinite,
    feeds a constant current to the connection point between the second control circuit and the fifth external pin, and
    determines the impedance of the external component based on the potential at the connection point between the second control circuit and the fifth external pin (Configuration 3-6).

Of the switching regulators disclosed herein, a switching regulator involving the third technical feature includes: the integrated circuit package of any of Configurations 3-1 to 3-6 described above; and an inductor connected to the fourth external pin (Configuration 3-7).

Of the vehicles disclosed herein, a vehicle involving the third technical feature includes: the switching regulator of Configuration 3-7 described above; and a battery that supplies the switching regulator with electric power (Configuration 3-8).

<Fourth Technical Feature>

Of the integrated circuit packages disclosed herein, an integrated circuit package involving a fourth technical feature includes:
  a first external pin to which an input voltage is applied;
  a second external pin to which a predetermined voltage lower than the input voltage is applied;
  a third external pin to which a feedback voltage is applied,
  a first switch of which a first terminal is connected to the first external pin;
  a second switch
    of which a first terminal is connected to a second terminal of the first switch and
    of which a second terminal is connected to the second external pin;
  a fourth external pin connected to the connection node between the first and second switches;
  a first control circuit configured to generate a step-down control signal for turning on and off the first and second switches complementarily in accordance with the feedback voltage;
  a second control circuit configured to generate a pulse signal of which the on-duty D ($0 \leq D \leq 1$) is fixed at a fixed value D' ($0 < D' < 1$) in a step-up/down mode;
  a fifth external pin from which the pulse signal is output in the step-up/down mode;
  a sixth external pin; and
  an added function circuit configured to perform, using a signal output from the sixth external pin to the outside or a signal fed to the sixth external pin from the outside, an added function related to at least one of the third and fourth switches which are controlled by the pulse signal (Configuration 4-1).

In the integrated circuit package of Configuration 4-1 described above, preferably,
  the second external pin is arranged between the fifth and sixth external pins (Configuration 4-2).

In the integrated circuit package of Configuration 4-1 or 4-2 described above, preferably,
  the added function circuit includes a discriminator configured to determine whether the load of a switching regulator that includes the integrated circuit package is light, and to output a signal indicating the result of determination by the discriminator from the sixth external pin to the outside (Configuration 4-3).

Of the switching regulators disclosed herein, a switching regulator involving the fourth technical feature includes:
the integrated circuit package of Configuration 4-3 described above;
an inductor of which a first terminal is connected to the fourth external pin;
a third switch
of which a first terminal is connected to a second terminal of the inductor and
of which a second terminal is connected to an application terminal of the predetermined voltage; and
a fourth switch of which a first terminal is connected to the connection node between the inductor and the third switch, wherein
when the load of the switching regulator is light in the step-up/down mode, the fourth switch is kept off based on the signal indicating the result of determination by the discriminator (Configuration 4-4).

In the integrated circuit package of Configuration 4-1 or 4-2 described above, preferably,
the added function circuit stops the operation of the first and second control circuits based on the signal fed to the sixth external pin from the outside (Configuration 4-5).

Of the switching regulators disclosed herein, another switching regulator involving the fourth technical feature includes:
the integrated circuit package of Configuration 4-5 described above; and
a sub integrated circuit package in which the third and fourth switches are included, wherein
the signal fed to the sixth external pin from the outside is a temperature information signal as to the sub integrated circuit package (Configuration 4-6).

In the switching regulator of Configuration 4-6 described above, preferably,
the sub integrated circuit package includes a temperature detector, and
a driving current for the temperature detector is supplied from the sixth external pin to the sub integrated circuit package (Configuration 4-7).

In the switching regulator of Configuration 4-7 described above, preferably,
the temperature detector is arranged near the fourth switch (Configuration 4-8).

Of the switching regulators disclosed herein, yet another switching regulator involving the fourth technical feature includes: the integrated circuit package of any of Configurations 4-1 to 4-3 and 4-5 described above; and an inductor connected to the fourth external pin (Configuration 4-9).

Of the vehicles disclosed herein, a vehicle involving the fourth technical feature includes: the switching regulator of any of Configurations 4-4 and 4-6 to 4-9 described above; and a battery that supplies the switching regulator with electric power (Configuration 4-10).

Advantageous Effects of the Invention

Of the switching regulators disclosed herein, with those involving the first technical feature, it is possible to provide a step-up/down switching regulator that, while suppressing an increase in costs, can be prevented from exhibiting right-half-plane-zero characteristics, offers response characteristics similar to step-down characteristics, and can suppress variation of the output voltage due to variation of the input voltage.

Of the switching regulators disclosed herein, with those involving the second technical feature, it is possible to provide a step-up/down switching regulator that, while suppressing an increase in costs, can be prevented from exhibiting right-half-plane-zero characteristics, offers response characteristics similar to step-down characteristics, and has step-down and step-up control signals with equivalent frequencies.

Of the integrated circuit packages disclosed herein, with those involving the third technical feature, it is possible to provide an integrated circuit package that can be used as a component of a step-up/down switching regulator which, while suppressing an increase in costs, can be prevented from exhibiting right-half-plane-zero characteristics and which offers response characteristics similar to step-down characteristics, the integrated circuit package in addition permitting determination of whether it is being used as one component of the step-up/down switching regulator.

Of the integrated circuit packages disclosed herein, with those involving the fourth technical feature, it is possible to provide an integrated circuit package that can be used as a component of a step-up/down switching regulator which, while suppressing an increase in costs, can be prevented from exhibiting right-half-plane-zero characteristics and which offers response characteristics similar to step-down characteristics, the integrated circuit package in addition being capable of supporting an added function of the step-up/down switching regulator.

DESCRIPTION OF EMBODIMENTS

<Overall Configuration (First Embodiment)>

Figure 1:
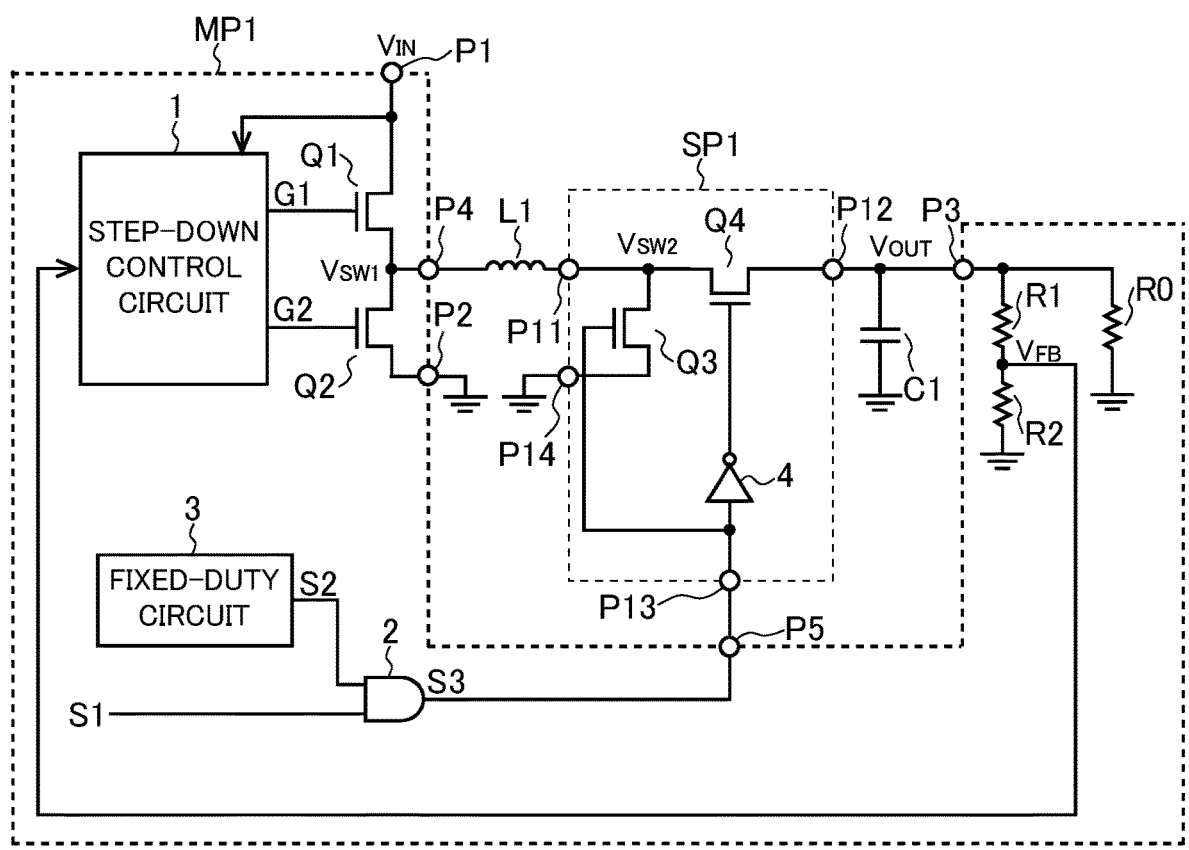
FIG. 1 is a diagram showing an example of the overall configuration of a switching regulator according to a first embodiment.

FIG. 1 is a diagram showing an example of the overall configuration of a switching regulator according to a first embodiment. The switching regulator 101 shown in FIG. 1 is a step-up/down switching regulator, and includes a step-down control circuit 1, MOS transistors Q1 to Q4, an inductor L1, an output capacitor C1, an output resistor R0, voltage division resistors R1 and R2, an AND gate 2, a fixed-duty circuit 3, and a NOT gate 4. A main integrated circuit package MP1 has external pins P1 to P5, and includes the MOS transistors Q1 and Q2, the step-down control circuit 1, the AND gate 2, and the fixed-duty circuit 3. A sub integrated circuit package SP1 has external pins P11 to P14, and includes the MOS transistors Q3 to Q4 and the NOT gate 4.

The MOS transistor Q1 is an N-channel MOS transistor, and is an example of a switch that switches between a conducting state and a cut-off state a current path from the external pin P1, to which an input voltage $V_{IN}$ is applied, to the external pin P4, to which one terminal of the inductor L1 is connected. The drain of the MOS transistor Q1 is connected to the external pin P1. The source of the MOS transistor Q1 is connected to the external pin P4 and to the drain of the MOS transistor Q2.

The MOS transistor Q2 is an N-channel MOS transistor, and is an example of a switch that switches between a conducting state and a cut-off state a current path from the external pin P2, which is grounded, to the external pin P4. The drain of the MOS transistor Q2 is connected, as mentioned above, to the external pin P4 and to the source of the MOS transistor Q1. The source of the MOS transistor Q2 is connected to the external pin P2. Instead of the MOS transistor Q2, a diode can be used.

The MOS transistor Q3 is an N-channel MOS transistor, and is an example of a switch that switches between a conducting state and a cut-off state a current path from the external pin P11 to the external pin P14. The drain of the MOS transistor Q3 is connected, via the external pin P11 and the inductor L1, to the external pin P4. The source of the MOS transistor Q3 is connected to the external pin P14. The external pin P14 is grounded.

The MOS transistor Q4 is an N-channel MOS transistor, and is an example of a switch that switches between a conducting state and a cut-off state a current path from the external pin P11 to the external pin P12. The drain of the MOS transistor Q4 is connected to the external pin P11 and to the drain of the MOS transistor Q3. The source of the MOS transistor Q4 is connected to the external pin P12. The external pin P12 is connected to one terminal of the output capacitor C1 and to the external pin P3. The other terminal of the output capacitor C1 is grounded. Instead of the MOS transistor Q4, a diode can be used.

The output capacitor C1 is a smoothing capacitor for reducing ripples in an output voltage $V_{OUT}$. The output voltage $V_{OUT}$ is subjected to phase compensation by a phase compensation circuit composed of the output capacitor C1 and the output resistor R0.

The output voltage $V_{OUT}$ is fed as a feedback voltage to the external pin P3. The voltage division resistors R1 and R2 divide the output voltage $V_{OUT}$ to generate a divided feedback voltage $V_{FB}$, and feeds the divided feedback voltage $V_{FB}$ to the step-down control circuit 1.

The step-down control circuit 1 generates gate signals G1 and G2 for the MOS transistors Q1 and Q2 respectively for turning on and off the MOS transistors Q1 and Q2 complementarily in accordance with the divided feedback voltage $V_{FB}$, and feeds the gate signals G1 and G2 to the gates of the MOS transistors Q1 and Q2 respectively. It is preferable that, when the MOS transistors Q1 and Q2 are turned on and off, there be provided a dead time in which the MOS transistors Q1 and Q2 are both off.

The AND gate 2 outputs a signal S3 which is the AND (logical product) of a mode specification signal S1 with a pulse signal S2, the latter being a pulse signal with a fixed on-duty that is output from the fixed-duty circuit 3. The mode specification signal S1, when at low level, acts as a signal that specifies a step-down mode and, when at high level, acts as a signal that specifies a step-up/down mode. There may be adopted a configuration where he switching regulator 101 incorporates a circuit (unillustrated) that generates the mode specification signal S1 or a configuration where the switching regulator 101 receives the mode specification signal S1 from outside.

Figure 2:
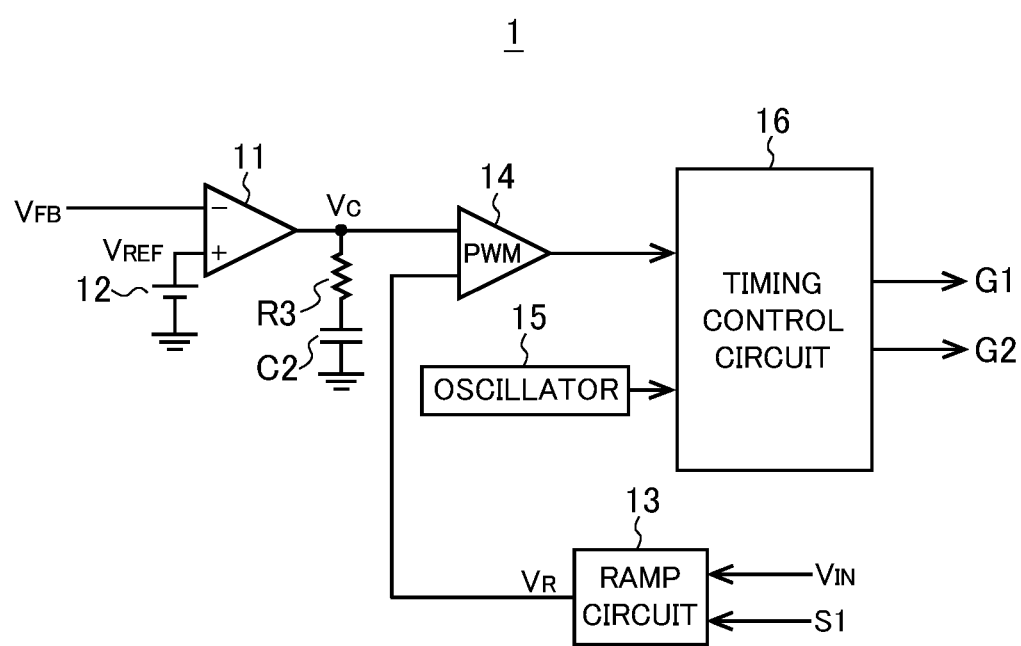
FIG. 2 is a diagram showing one configuration example of a step-down control circuit in the first embodiment.

The output signal S3 of the AND gate 2 is, on one hand, fed via the external pins P5 and P13 to the gate of the MOS transistor Q3, and is, on the other hand, logically inverted by the NOT gate 4 and then fed to the gate of the MOS transistor Q4. It is preferable that, instead of the NOT gate 4, a dead time generation circuit be used so that, when the MOS transistors Q3 and Q4 are turned on and off, there is a dead time in which the MOS transistors Q3 and Q4 are both off Configuration Example of the Step-Down Control Circuit FIG. 2 is a diagram showing one configuration example of the step-down control circuit 1. In the example shown in FIG. 2, the step-down control circuit 1 is composed of an error amplifier 11, a reference voltage source 12, a resistor R3, a capacitor C2, a ramp circuit 13, a comparator 14, an oscillator 15, and a timing control circuit 16.

The error amplifier 11 generates an error signal $V_C$ that is commensurate with the difference between the divided feedback voltage $V_{FB}$ and a reference voltage $V_{REF}$ output from the reference voltage source 12. The error signal $V_C$ is subjected to phase compensation by a phase compensation circuit composed of the resistor R3 and the capacitor C2.

The ramp circuit 13 generates and outputs a ramp voltage $V_R$ with a gradient commensurate with the input voltage $V_{IN}$. Moreover, when the mode specification signal S1 is at high level, that is, in the step-up/down mode, the ramp circuit 13 generates and outputs a ramp voltage $V_R$ with a gradient commensurate both with an on-duty value output from the fixed-duty circuit 3 and with the input voltage $V_{IN}$.

The comparator 14 compares the phase-compensated error signal $V_C$ and the ramp voltage $V_R$ to generate a reset signal as a comparison signal.

The oscillator 15 outputs a clock signal with a predetermined frequency to the timing control circuit 16.

The timing control circuit 16 switches the gate signal G1 from low level to high level when a set signal (the clock signal output from the oscillator 15) switches from high level to low level, and switches the gate signal G1 from high level to low level when the reset signal switches from the low level to high level.

<Operating Modes>

A description will now be given of, as an example of the switching of operating modes, a case where, when the ratio of the input voltage $V_{IN}$ to the output voltage $V_{OUT}$ is equal to or higher than a threshold value TH, the mode specification signal S1 is at low level and, when the ratio of the input voltage $V_{IN}$ to the output voltage $V_{OUT}$ is lower than the threshold value TH, the mode specification signal S1 is at high level.

Figure 3:
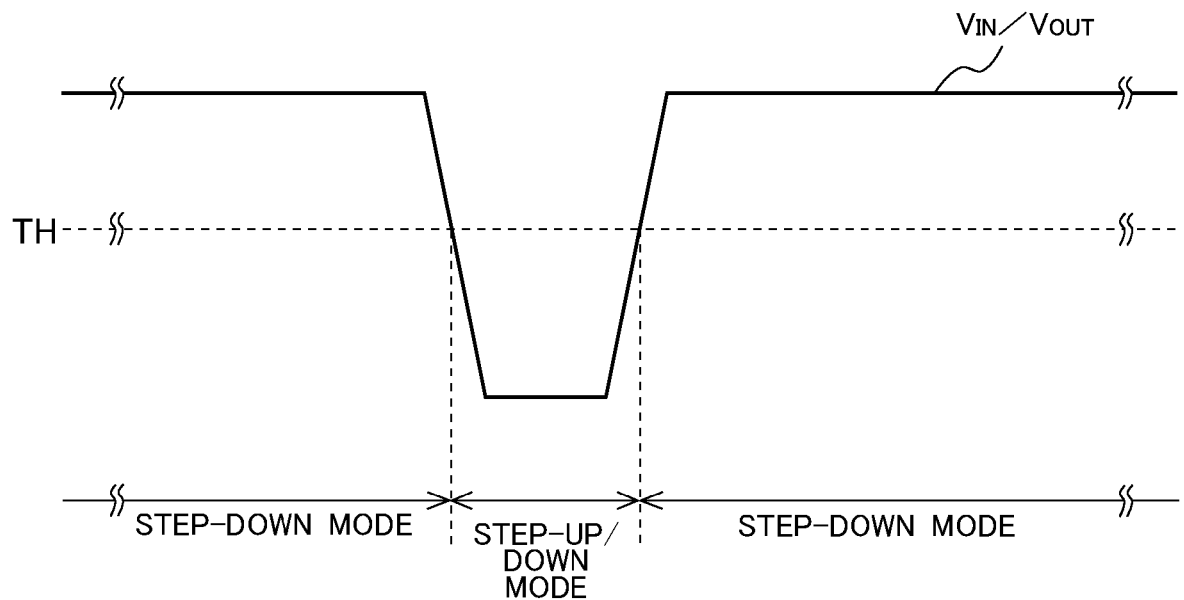
FIG. 3 is a diagram showing an outline of the waveform of the ratio of an input voltage to an output voltage.

When the ratio of the input voltage $V_{IN}$ to the output voltage $V_{OUT}$ is equal to or higher than the threshold value TH, the switching regulator 101 operates in the step-down mode (see FIG. 3). In the step-down mode, the step-down control circuit 1 turns on and off the MOS transistors Q1 and Q2 in accordance with the divided feedback voltage $V_{FB}$; since the mode specification signal S1 is at low level, the MOS transistor Q3 is held off, and the MOS transistor Q4 is held on.

The transfer characteristics of the entire switching regulator 101 in the step-down mode are given by formula (3) below.

[Formula 3]

$$\frac{\Delta V_{OUT}}{\Delta V_C} = \frac{R}{R_S} \cdot \frac{1}{1 + R \cdot C \cdot s} \quad (3)$$

where
$V_C$ represents the output voltage of the error amplifier 11;
R represents the resistance value of the output resistor R0;
$R_S$ represents the current sense gain; and
C represents the capacitance value of the output capacitor C1.

On the other hand, when the ratio of the input voltage $V_{IN}$ to the output voltage $V_{OUT}$ is lower than the threshold value TH, the switching regulator 101 operates in the step-up/down mode (see FIG. 3). In the step-up/down mode, the step-down control circuit 1 turns on and off the MOS transistors Q1 and Q2 in accordance with the divided feedback voltage $V_{FB}$; since the mode specification signal S1 is at high level, while the on-duty D (0≤D≤1) of the MOS transistor Q3 is fixed at a fixed value D' (0<D'<1), the MOS transistors Q3 and Q4 turns on and off complementarily. It should be noted that, in the step-up/down mode, the on-duty of the MOS transistor Q3 is set independently of either of the output voltage $V_{OUT}$ and the input voltage $V_{IN}$.

The transfer characteristics of the entire switching regulator 101 in the step-up/down mode are given by formula (4) below.

[Formula 4]

$$\frac{\Delta V_{OUT}}{\Delta V_C} = \frac{R}{R_S} \cdot (1 - D') \cdot \frac{1}{1 + R \cdot C \cdot s} \quad (4)$$

where
$V_C$ represents the output voltage of the error amplifier 11;
R represents the resistance value of the output resistor R0;
$R_S$ represents the current sense gain;
C represents the capacitance value of the output capacitor C1; and
D' the on-duty (a fixed value) of the MOS transistor Q3.

Formulae (3) and (4) above dictate that the transfer characteristics of the entire switching regulator 101 in the step-up/down mode equals the transfer characteristics of the entire switching regulator 101 in the step-down mode multiplied by (1−D'). Accordingly, the transfer characteristics of the switching regulator 101 in the step-up/down mode are similar to the transfer characteristics of the switching regulator 101 in the step-down mode. Thus, the transfer function of the switching regulator 101 in the step-up/down mode does not have right-half-plane-zero characteristics. Hence, the output capacitor C1 does not need to have a high capacitance, and this helps reduce the cost of the output capacitor.

Figure 23:
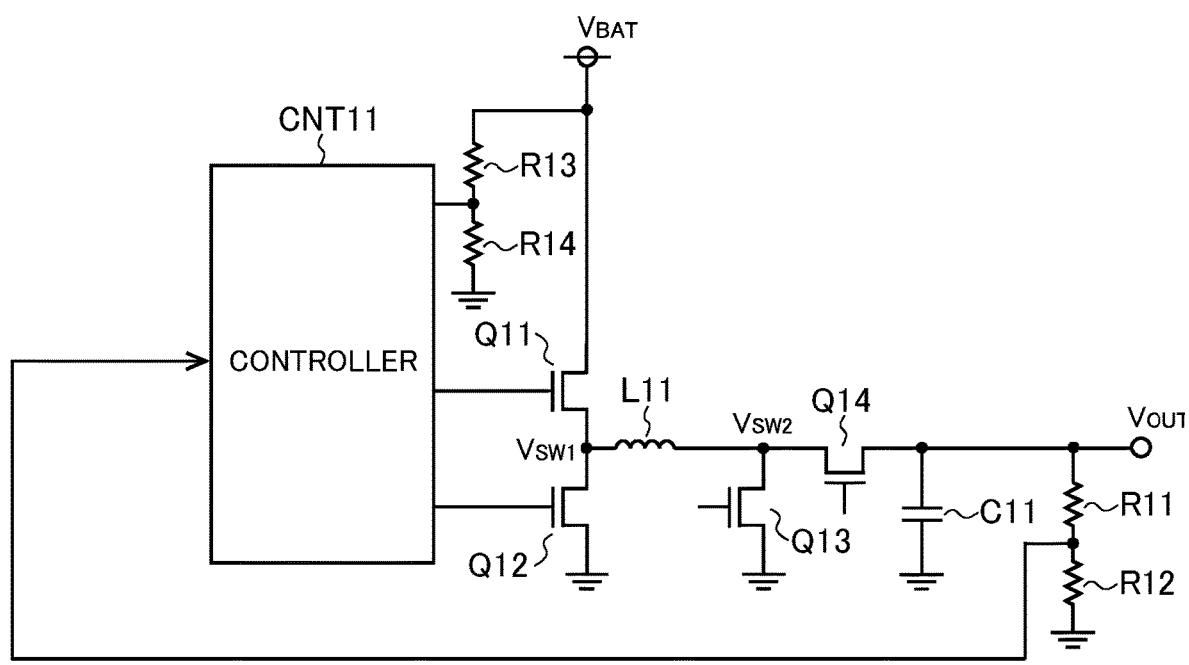
FIG. 23 is a diagram showing the configuration of a common step-up/down switching regulator.
Figure 24:
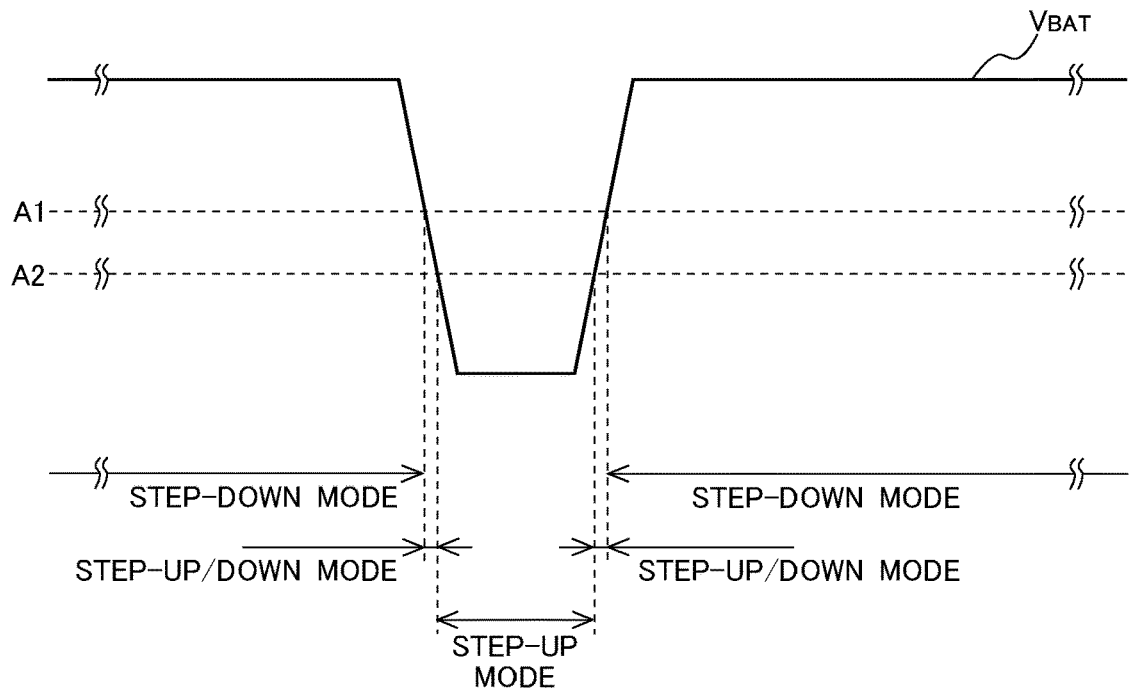
FIG. 24 is a diagram showing an outline of the waveform of a battery voltage.
Figure 25A:
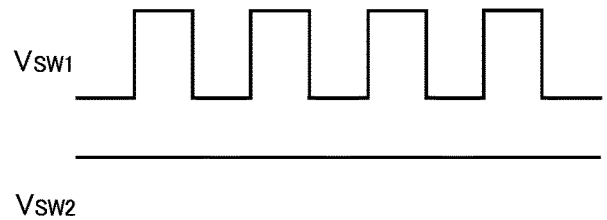
FIG. 25A is a diagram showing an outline of the waveforms of relevant switch voltages in a step-down mode.
Figure 25B:
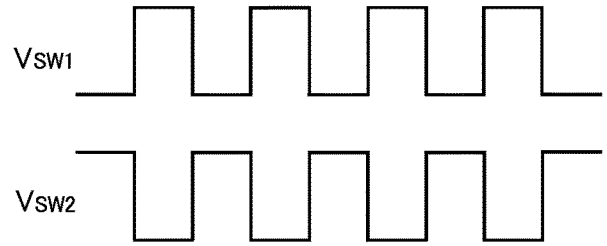
FIG. 25B is a diagram showing an outline of the waveforms of relevant switch voltages in a step-up/down mode.
Figure 25C:
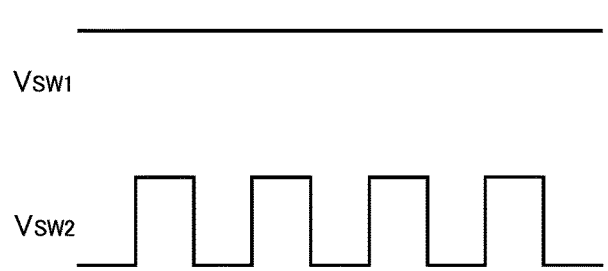
FIG. 25C is a diagram showing an outline of the waveforms of relevant switch voltages in a step-up mode.

Moreover, the switching regulator 101 is configured not to require separate reactors in step-up and step-down switching regulator portions respectively, and this helps reduce the cost for a reactor. In addition, in the above-described example of the switching of operating modes, switching between the step-up/down mode and the step-down mode takes place depending on whether or not the ratio of the input voltage $V_{IN}$ to the output voltage $V_{OUT}$ is equal to or higher than the threshold value TH. By contrast, in the common step-up/down switching regulator shown in FIG. 23, switching between the step-up/down or step-up mode and the step-down mode takes place depending on whether or not the battery voltage $V_{BAT}$ is equal to or lower than a first predetermined value A1. Thus, while the common step-up/down switching regulator shown in FIG. 23 suffers from the problem of the optimum value of the first predetermined value A1 varying with the setting of the output voltage $V_{OUT}$, the switching regulator 101 has a constant optimum value for the threshold value TH with varying setting of the output voltage $V_{OUT}$, and thus requires no change in the setting for the threshold value TH.

Example of Ramp Voltage Generation

Figure 4:
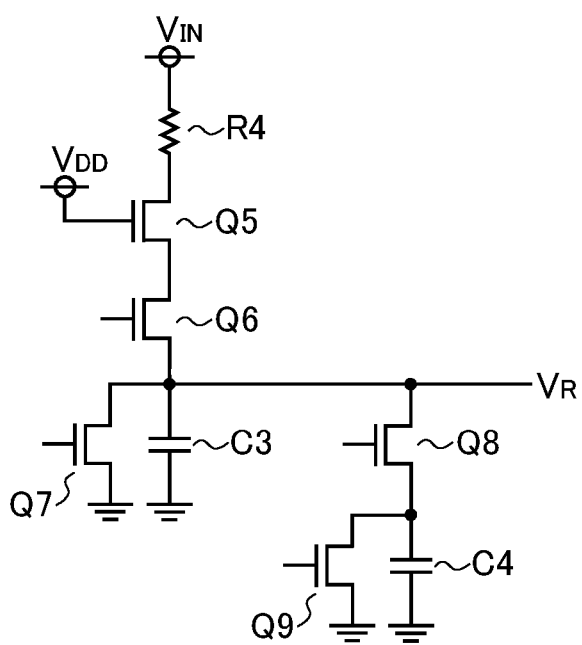
FIG. 4 is a diagram showing one configuration example of a ramp circuit in the first embodiment.

FIG. 4 is a diagram showing one configuration example of the ramp circuit 13. In the example shown in FIG. 4, the ramp circuit 13 is composed of a resistor R4, MOS transistors Q5 to Q9, capacitors C3 and C4, and a charge/discharge controller (unillustrated). Connected in series from a terminal to which the input voltage $V_{IN}$ is applied to a grounded terminal are: the resistor R4; the MOS transistor Q5, which is a NDMOS (N-channel double-diffused MOS) transistor for withstand voltage enhancement; the MOS transistor Q6, which is a charge switch; and the capacitor C3. The MOS transistor Q7, which is a discharge switch, is connected in parallel with the capacitor C3. Connected in series from the connection node between the MOS transistor Q6 and the capacitor C3 to the grounded terminal are: the MOS transistor Q8, which is a charge switch; and the capacitor C4. The MOS transistor Q9, which is a discharge switch, is connected in parallel with the capacitor C4.

Figure 5:
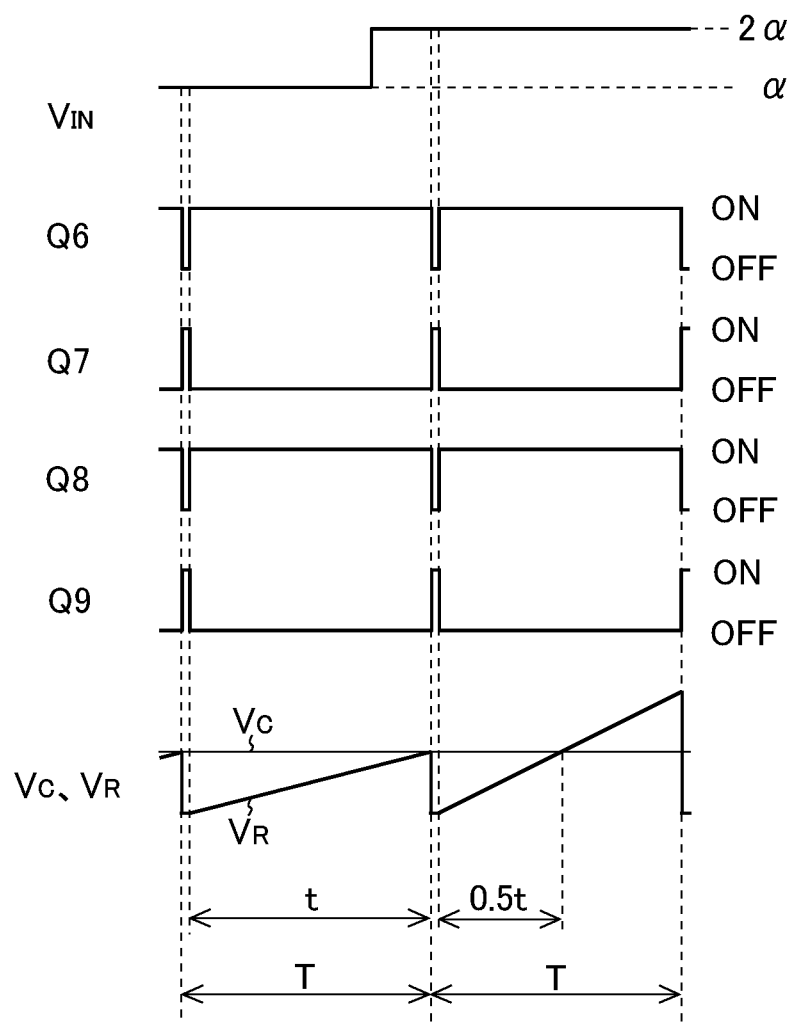
FIG. 5 is a timing chart showing one example of the operation of a ramp circuit in a step-down mode.

FIG. 5 is a timing chart showing an example of the operation of the ramp circuit 13 shown in FIG. 4 as observed when the switching regulator 101 operates in the step-down mode.

In synchronism with the clock signal output from the oscillator 15, the charge/discharge controller (unillustrated) turns on and off the MOS transistors Q6 to Q9 at a predetermined period T equal to the period of the clock signal output from the oscillator 15. Thus, the period of the ramp voltage $V_R$ equals the predetermined period T. In the step-down mode, the ramp voltage $V_R$ is the charge voltage across the capacitors C3 and C4. The charge currents in the capacitors C3 and C4 are proportional to the input voltage $V_{IN}$.

Thus, the ramp circuit 13 shown in FIG. 4 operates as follows: when, for example, the input voltage $V_{IN}$ becomes twice as high (from α to 2α) in the step-down mode as shown in FIG. 5, the charge currents in the capacitors C3 and C4 become twice as high, and thus the gradient of the ramp voltage $V_R$ becomes twice as large, with the result that the on-duty of the MOS transistor Q1 becomes one-half (from t/T to 0.5 t/T). The operation in the step-up/down mode differs from that in the step-down mode only in that, as will be described later, the capacitor C3 alone is the charge target capacitor.

That is, in response to variation of the input voltage $V_{IN}$, the ramp circuit 13 shown in FIG. 4 suppresses variation of the error signal $V_C$ through feed-forward control of the gradient of the ramp voltage $V_R$. In this way, the switching regulator 101 can suppress variation of the output voltage $V_{OUT}$ resulting from variation of the input voltage $V_{IN}$.

Figure 6:
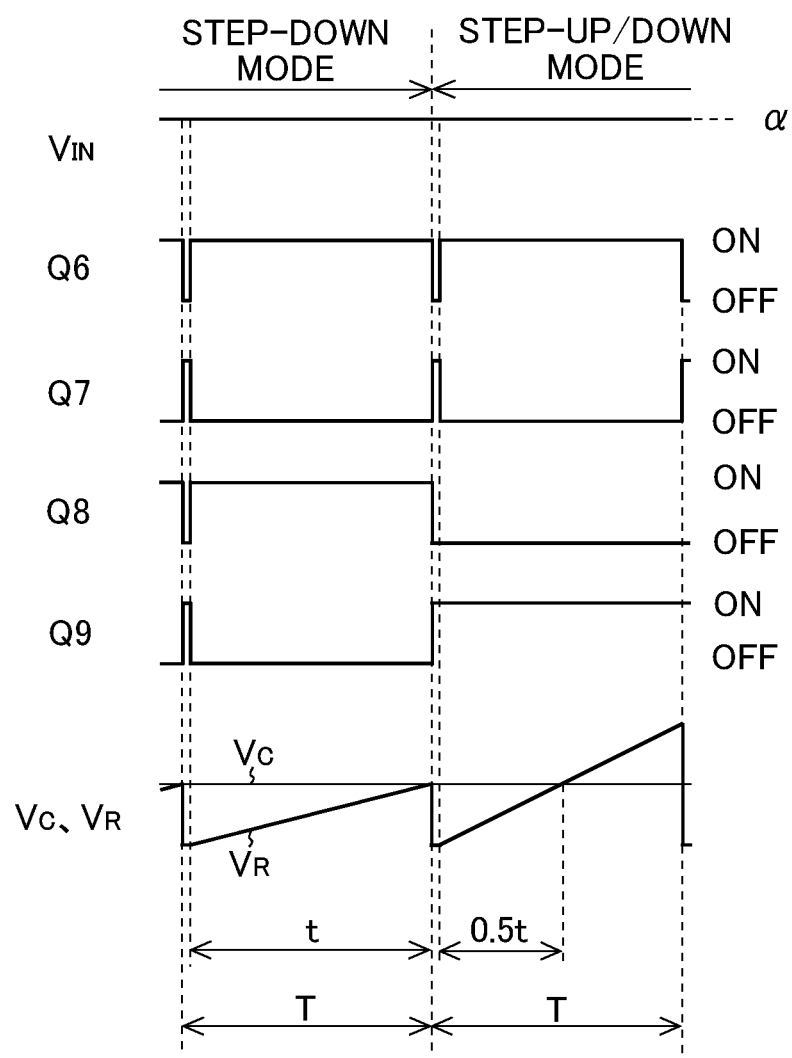
FIG. 6 is a timing chart showing one example of the operation of a ramp circuit in step-down and step-up/down modes.

FIG. 6 is a timing chart showing an example of the operation of the ramp circuit 13 shown in FIG. 4 as observed when the switching regulator 101 shifts from the step-down mode to the step-up/down mode. The example here deals with a case where the fixed value D' equals 0.5.

In the step-up/down mode, the ramp circuit 13 shown in FIG. 4 keeps the MOS transistor Q8 off and the MOS transistor Q9 on to make the capacitor C3 the sole charge target capacitor. The capacitance of the capacitor C3 equals one-half of the combined capacitance of the capacitors C3 and C4. Accordingly, in the ramp circuit 13 shown in FIG. 4, for example, when it shifts from the step-down mode to the step-up/down mode as shown in FIG. 6, the capacitance of the charge target capacitor becomes one-half, and the gradient of the ramp voltage $V_R$ becomes twice as large, with the result that the on-duty of the MOS transistor Q1 becomes one-half (from t/T to 0.5 t/T). Thus, the value obtained by multiplying together the reciprocal of the value obtained by subtracting the fixed value D' from one and the on-duty of the MOS transistor Q1 immediately after the shift from the step-down mode to the step-up/down mode equals the on-duty of the MOS transistor Q1 immediately before the shift from the step-down mode to the step-up/down mode.

That is, on a shift from the step-down mode to the step-up/down mode, the ramp circuit 13 shown in FIG. 4 suppresses variation of the error signal $V_C$ through feed-forward control of the gradient of the ramp voltage $V_R$. Also on a shift from the step-up/down mode to the step-down mode, as on a shift from the step-down mode to the step-up/down mode, the ramp circuit 13 shown in FIG. 4 suppresses variation of the error signal $V_C$ through feed-forward control of the gradient of the ramp voltage $V_R$. In this way, the switching regulator 101 can suppress variation of the output voltage $V_{OUT}$ resulting from a switch between the step-down and the step-up/down modes.

Although, in the above description, the fixed-duty circuit 3 sets a single fixed value D' of the on-duty, the fixed-duty circuit 3 may instead set a plurality of fixed values D' of the on-duty. For example, to permit two fixed values of 0.5 and 0.3 to be set to permit one of the fixed value D' 0.5 and 0.3 to be chosen, the ramp circuit 13 can be configured, for example, as shown in FIG. 7.

Figure 7:
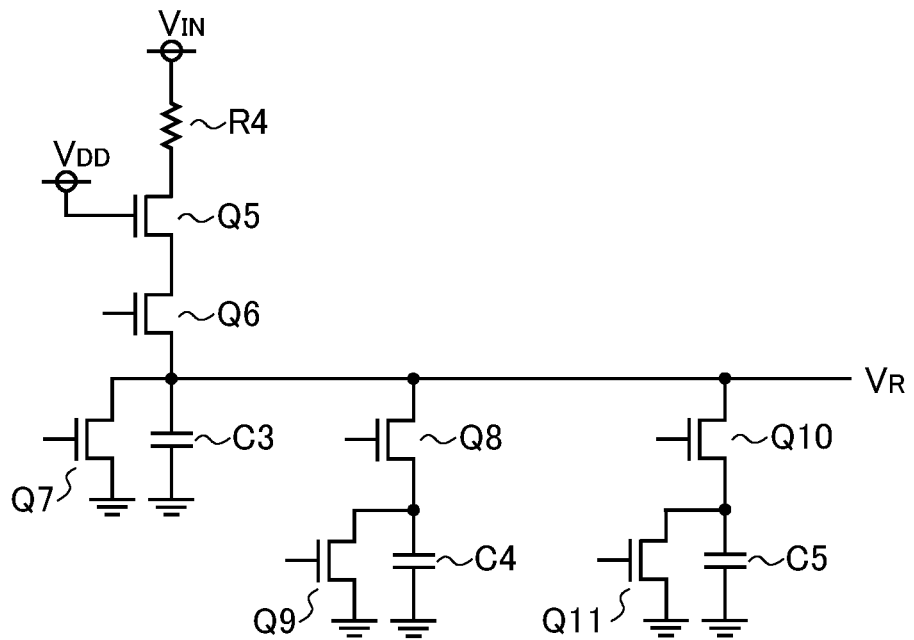
FIG. 7 is a diagram showing another configuration example of a ramp circuit in the first embodiment.

In the ramp circuit 13 shown in FIG. 7, in the step-down mode, the charge target capacitors are the capacitors C3 to C5; in the step-up/down mode with the fixed value D' set at 0.5, the charge target capacitors are the capacitors C3 and C4; and in the step-up/down mode with the fixed value D' set at 0.3, the charge target capacitor is the capacitor C3. The ratio of the combined capacitance of the capacitors C3 to C5, the combined capacitance of the capacitors C3 and C4, and the capacitance of the capacitor C3 can be set such that C3 to C5 Combined Capacitance: C3 & C4 Combined Capacitance: C3 Capacitance=1.0:0.5:0.3.

Figure 8:
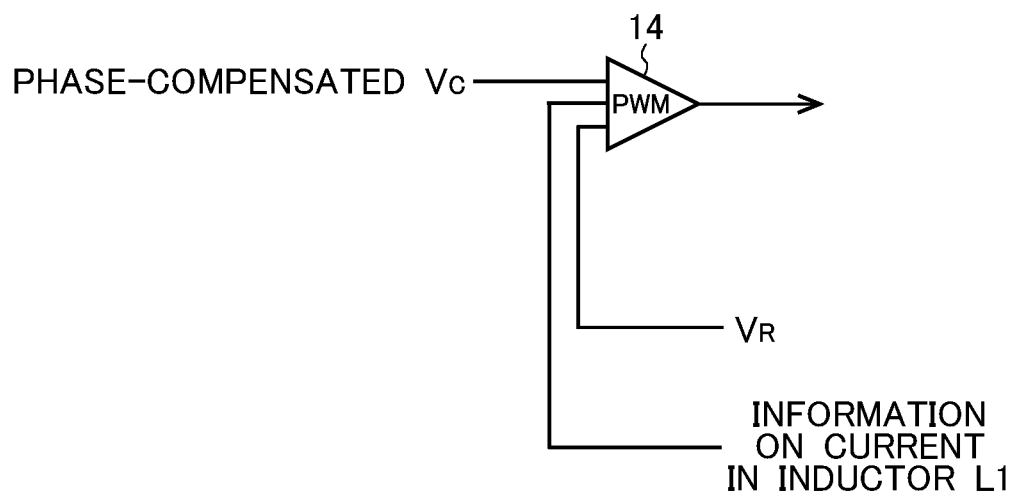
FIG. 8 is a diagram showing a modified example of a comparator in the first embodiment.

In the above description, the switching regulator 101 is configured as a voltage mode control switching regulator; instead, a current detector that acquires information on the current in the inductor L1 may be provided and, as shown in FIG. 8, the comparator 14 may be provided with a terminal to which the information on the current in the inductor L1 is fed so that the comparator 14 applies an offset commensurate with the current in the inductor L1 to one of the ramp voltage $V_R$ or the phase-compensated error signal $V_C$; that is, the switching regulator 101 may be configured as a current mode control switching regulator.

The presence of the above-mentioned offset causes no change in the relationship between the gradient of the ramp voltage $V_R$ and the on-duty of the MOS transistor Q1. That is, a current mode control switching regulator provides effects similar to those provided by a voltage mode control switching regulator.

<Overall Configuration (Second Embodiment)>

Figure 9:
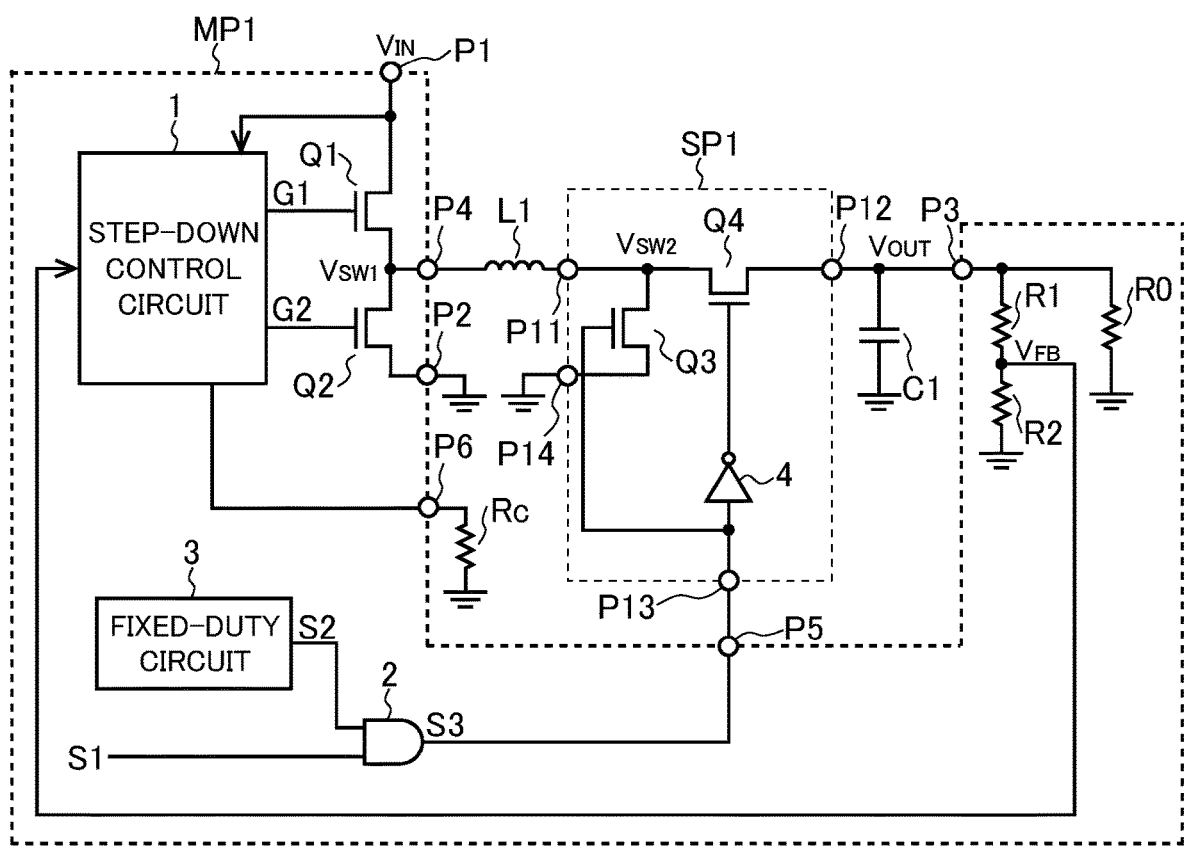
FIG. 9 is a diagram showing an example of the overall configuration of a switching regulator according to a second embodiment.

FIG. 9 is a diagram showing an example of the overall configuration of a switching regulator according to a second embodiment. To follow is a description of the switching regulator 102 shown in FIG. 9, where for such parts as are similar to their counterparts in the switching regulator 101 described previously, no overlapping description will be repeated unless helpful.

In the switching regulator 102, the main integrated circuit package MP1 further has an external pin P6. An externally fitted resistor $R_C$ for setting the clock frequency is connected to the external pin P6. In the switching regulator 102, the clock frequency is variable with the resistance value of the externally fitted resistor $R_C$.

Configuration Example of the Step-Down Control Circuit

Figure 10:
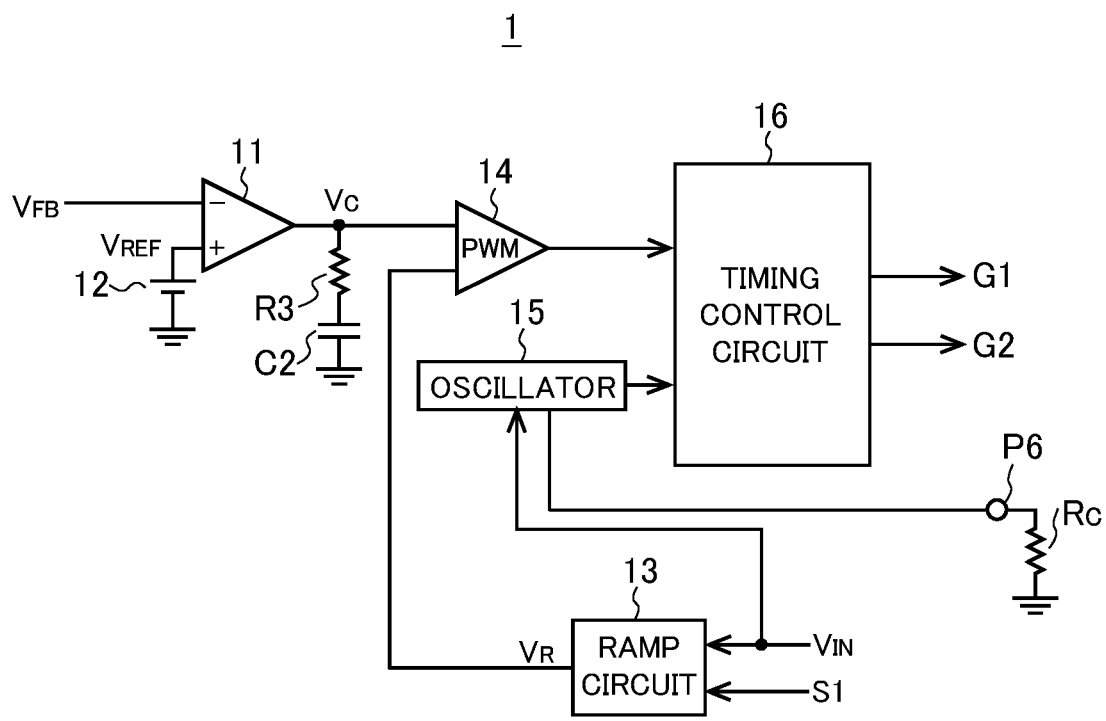
FIG. 10 is a diagram showing one configuration example of a step-down control circuit in the second embodiment.

FIG. 10 is a diagram showing one configuration example of the step-down control circuit 1 in the second embodiment.

The oscillator 15 generates a clock signal CLK1 with a frequency commensurate with the resistance value of the externally fitted resistor $R_C$. The ramp circuit 13 generates a ramp voltage $V_R$ with a frequency equal to the frequency (clock frequency) of the clock signal CLK1.

Figure 11:
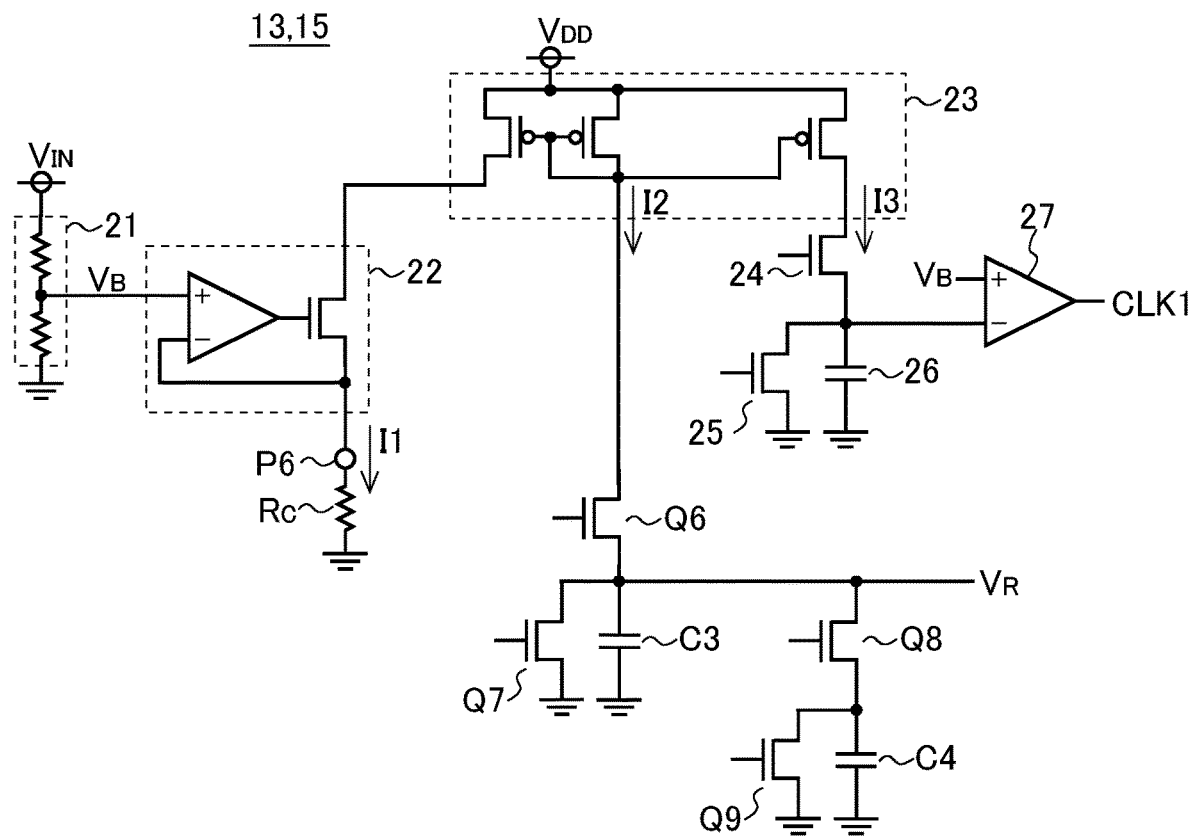
FIG. 11 is a diagram showing one configuration example of a ramp circuit and an oscillator in the second embodiment.

FIG. 11 is a diagram showing one configuration example of the ramp circuit 13 and the oscillator 15 in the second embodiment. In FIG. 11, the same parts as in FIG. 4 are identified by the same reference numerals.

A voltage division circuit 21 generates a division voltage $V_B$ of the input voltage $V_{IN}$. A voltage-current conversion circuit 22 converts the division voltage $V_B$ of the input voltage $V_{IN}$ into a current I1 at a conversion factor commensurate with the resistance value of the externally fitted resistor $R_C$.

A current mirror circuit 23 generates, using an internal supply voltage $V_{DD}$, currents I2 and I3 based on the current I1. Usable as the internal supply voltage $V_{DD}$ is, for example, a constant voltage generated using the input voltage $V_{IN}$ within the main integrated circuit package MP1, the input voltage $V_{IN}$ itself, a division voltage of the input voltage $V_{IN}$, or the like. The current I2 is a current that is a first predetermined multiple of the current I1, and the current I3 is a current that is a second predetermined multiple of the current I1. The first and second multiples may be equal, or may be different.

The current I2 charges, in the step-down mode, the capacitors C3 and C4 and, in the step-up/down mode, the capacitor C3 alone to generate the ramp voltage $V_R$.

On the other hand, a capacitor 26 is charged by the current I3 when a MOS transistor 24, which is a charge switch, is on, and is discharged when a MOS transistor 25, which is a discharge switch, is on. The MOS transistors 24 and 25 are turned on and of complementarily. A comparator 27 outputs the clock signal CLK1, which is the result of comparison of the charge voltage across the capacitor 26 with the division voltage $V_B$ of the input voltage $V_{IN}$. MOS transistors Q7 and 25 (and, in the step-up/down mode, also a MOS transistor Q9), which are discharge switches, switch from off to on in synchronism with a falling edge in the clock signal CLK1, and turns back to off a predetermined period thereafter.

The gradient of the charge voltage across the capacitor 26 is proportional both to the input voltage $V_{IN}$ and the resistance value of the externally fitted resistor $R_C$, and the division voltage $V_B$ of the input voltage $V_{IN}$, which is compared with the charge voltage across the capacitor 26 in the comparator 27, is proportional to the input voltage $V_{IN}$. Accordingly, the period of the clock signal CLK1 does not vary even when the input voltage $V_{IN}$ varies, and is inversely proportional to the resistance value of the externally fitted resistor $R_C$. On the other hand, the gradient of the ramp voltage $V_R$ is proportional both to the input voltage $V_{IN}$ and to the resistance value of the externally fitted resistor $R_C$. Accordingly, unless the phase-compensated error signal $V_C$ varies, the on-duty time (the on-time in one period) of the MOS transistor Q1 is inversely proportional both to the input voltage $V_{IN}$ and the resistance value of the externally fitted resistor $R_C$.

That is, except that, as the resistance value of the externally fitted resistor $R_C$ varies, the frequency of the clock signal CLK1 and the ramp voltage $V_R$ varies, how the feed-forward control of the gradient of the ramp voltage $V_R$ is achieved in response to variation of the input voltage $V_{IN}$ and how the feed-forward control of the gradient of the ramp voltage $V_R$ is achieved on switching between the step-down and step-up/down modes are the same as in the first embodiment.

Figure 12:
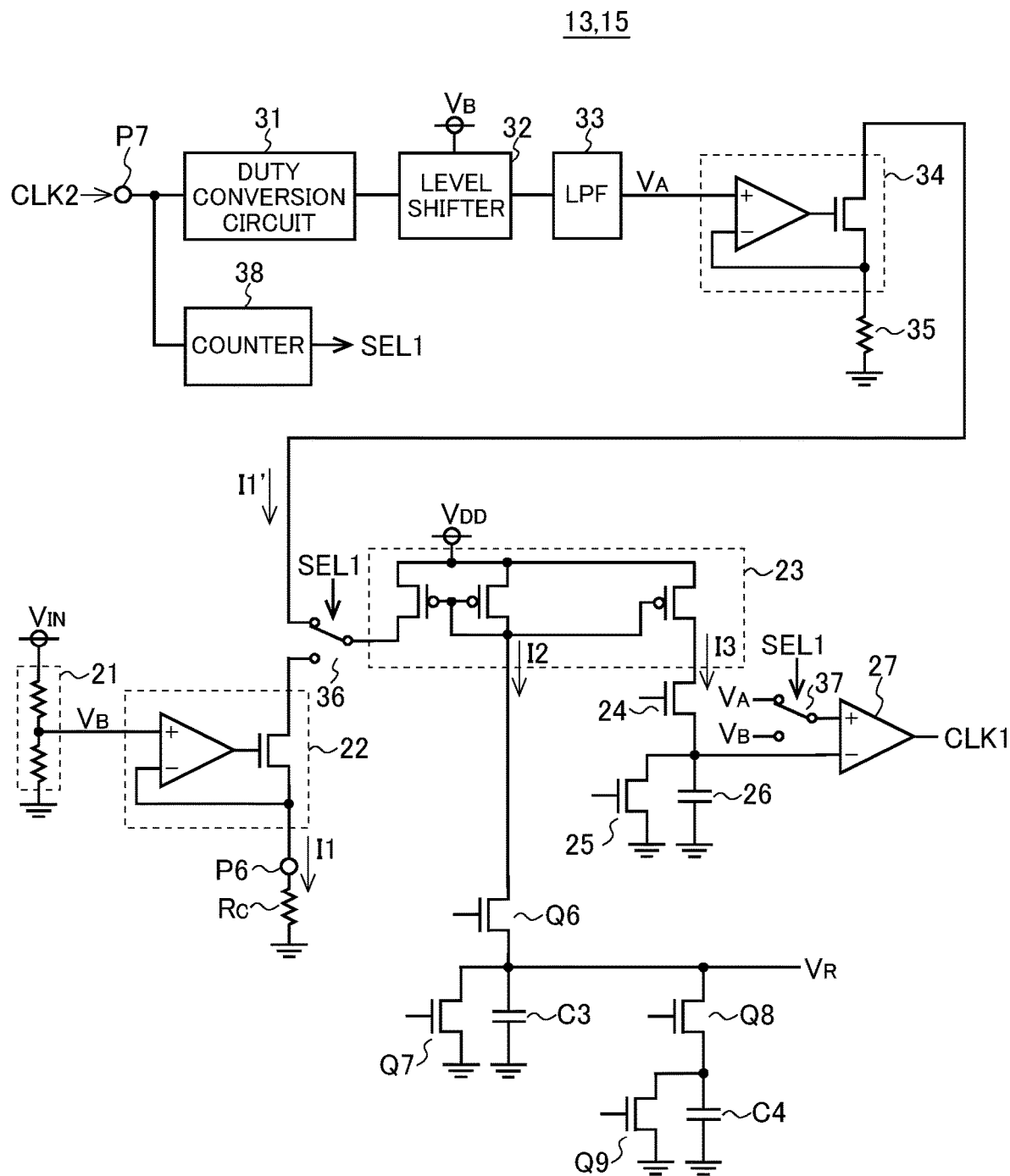
FIG. 12 is a diagram showing another configuration example of a ramp circuit and an oscillator in the second embodiment.

FIG. 12 is a diagram showing another configuration example of the ramp circuit 13 and the oscillator 15 in the second embodiment. In FIG. 12, the same parts as in FIG. 11 are identified by the same reference numerals.

In a case where the ramp circuit 13 and the oscillator 15 shown in FIG. 12 are used, the main integrated circuit package MP1 is further provided with an external pin P7. The external pin P7 is an input terminal for an external clock signal CLK2.

The ramp circuit 13 and the oscillator 15 shown in FIG. 12, as compared with the ramp circuit 13 and the oscillator 15 shown in FIG. 11, further include a duty conversion circuit 31, a level shifter 32, a low-pass filter 33, a voltage-current conversion circuit 34, a resistor 35, switches 36 and 37, and a counter 38.

First, a description will be given of a case where the external clock signal CLK2 is being fed to the external pin P7. The duty conversion circuit 31 converts the external clock signal CLK2 into a first pulse signal with an on-duty proportional to the frequency of the external clock signal CLK2. The level shifter 32 converts the first pulse signal into a second pulse signal with a crest value level proportional to the division voltage $V_B$ of the input voltage $V_{IN}$. The low-pass filter 33 converts the second pulse signal into a direct-current voltage $V_A$. Thus, the direct-current voltage $V_A$ is proportional both to the frequency of the external clock signal CLK2 and to the input voltage $V_{IN}$. The voltage-current conversion circuit 34 converts the direct-current voltage $V_A$ into a current I1' at a conversion factor commensurate with the resistance value of the resistor 35.

On counting a predetermined number based on the external clock signal CLK2, the counter 38 turns a selection signal SEL1 to high level. The high-level selection signal SEL1 makes the switch 36 select the voltage-current conversion circuit 34 as the connection destination of the current mirror circuit 23. Based on the high-level selection signal SEL1, the switch 37 selects the direct-current voltage $V_A$ as the voltage to be fed to the non-inverting input terminal of the comparator 27. In this case, the frequency of the clock signal CLK1 and the ramp voltage $V_R$ is a frequency commensurate not with the resistance value of the externally fitted resistor $R_C$ but with the frequency of the external clock signal CLK2. The ramp circuit 13 and the oscillator 15 here are the same as those shown in FIG. 11 with regard to how the feed-forward control of the gradient of the ramp voltage $V_R$ is achieved in response to variation of the input voltage $V_{IN}$ and how the feed-forward control of the gradient of the ramp voltage $V_R$ is achieved on switching between the step-down and step-up/down modes.

Next, a description will be given of a case where the external clock signal CLK2 is not being fed to the external pin P7. In this case, the counter 38 does not count the predetermined number, and thus the selection signal SEL1 remains at low level. Based on the low-level selection signal SEL1, the switch 36 selects the voltage-current conversion circuit 22 as the connection destination of the current mirror circuit 23. Based on the low-level selection signal SEL1, the switch 37 selects the division voltage $V_B$ of the input voltage $V_{IN}$ as the voltage to be fed to the non-inverting input terminal of the comparator 27. Thus, when the external clock signal CLK2 is not being fed to the external pin P7, the ramp circuit 13 and the oscillator 15 shown in FIG. 12 are equivalent to the ramp circuit 13 and the oscillator 15 shown in FIG. 11.

In the ramp circuit 13 and the oscillator 15 shown in FIG. 11 and described above, and in the ramp circuit 13 and the oscillator 15 shown in FIG. 12 and described above, the frequency of the clock signal CLK1 may be spread across a spectrum. In that case, the above-mentioned first and second predetermined multiples, which are the current mirror ratios in the current mirror circuit 23, can be varied while the ratio of the second predetermined multiple to the first predetermined multiple is kept constant. In one specific circuit configuration, a plurality of I2 output transistors are provided, and the number of I2 output transistors that are actually used to output the current I2 is switched with a switch; likewise, a plurality of I3 output transistors are provided, and the number of I3 output transistors that are actually used to output the current I3 is switched with a switch.

Third Embodiment

A switching regulator according to a third embodiment is an example of the switching regulator 101 according to the first embodiment shown in FIG. 1. In the switching regulator according to the third embodiment, the fixed-duty circuit 3 and the oscillator 15 are configured as shown in FIG. 13.

Figure 13:
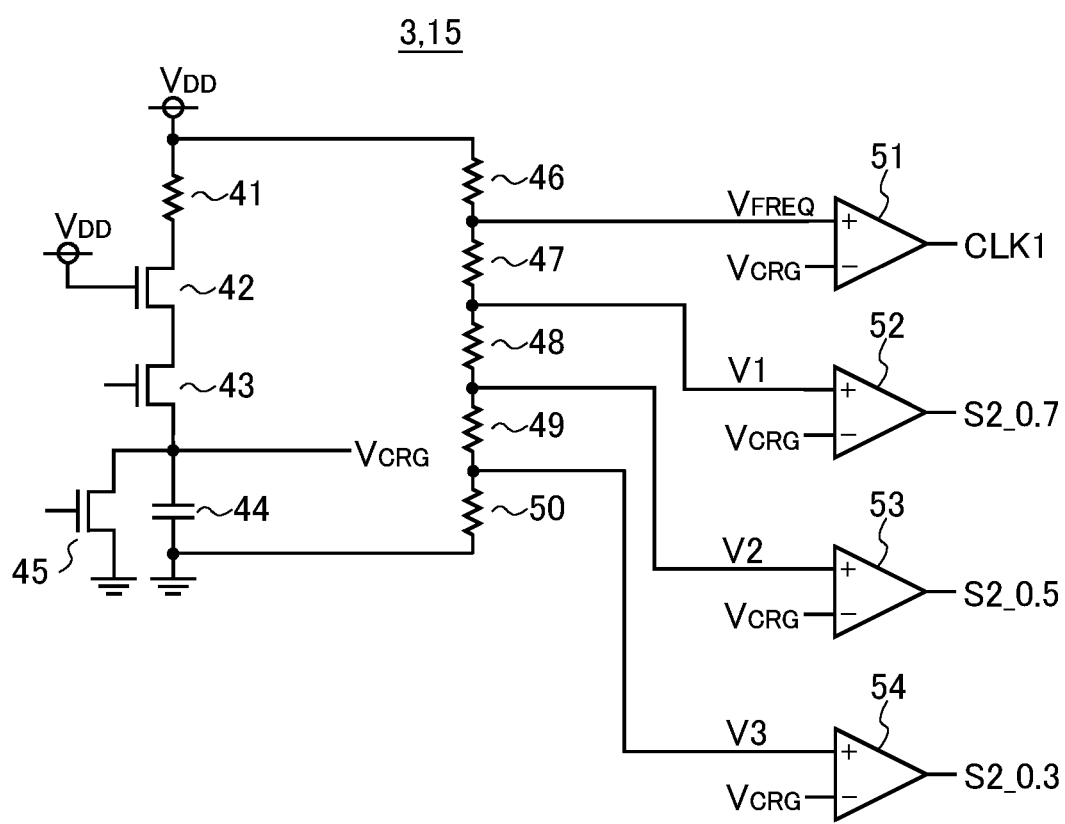
FIG. 13 is a diagram showing the configuration of a fixed-duty circuit and an oscillator in a third embodiment.

The fixed-duty circuit 3 and the oscillator 15 shown in FIG. 13 are composed of a resistor 41, MOS transistors 42, 43, and 45, a capacitor 44, resistors 46 to 50, comparators 51 to 54, and a charge/discharge controller (unillustrated).

Connected in series from a terminal to which the internal supply voltage $V_{DD}$ is applied to the grounded terminal are: the resistor 41; the MOS transistor 42, which is an NDMOS transistor for withstand voltage enhancement; the MOS transistor 43, which is a charge switch; and the capacitor 44. The MOS transistor 45, which is a discharge switch, is connected in parallel with the capacitor 44. Usable as the internal supply voltage $V_{DD}$ is, for example, a constant voltage generated using the input voltage $V_{IN}$ within the main integrated circuit package MP1, the input voltage $V_{IN}$ itself, a division voltage of the input voltage $V_{IN}$, or the like.

The resistors 46 to 50 divide the internal supply voltage $V_{DD}$ to generate a reference voltage $V_{FREQ}$ and voltages V1 to V3. The voltage V1 equals 0.7 times the reference voltage $V_{FREQ}$, the voltage V2 equals 0.5 times the reference voltage $V_{FREQ}$, and the voltage V3 equals 0.3 times the reference voltage $V_{FREQ}$.

The charge/discharge controller (unillustrated) turns on and off the MOS transistors Q6 to Q9 in synchronism with the clock signal CLK1 output from the comparator 51.

The comparator 51 compares the reference voltage $V_{FREQ}$ with the charge voltage $V_{CRG}$ across the capacitor 44, which is a ramp voltage, to generate the clock signal CLK1. The comparator 52 compares the voltage V1 with the charge voltage $V_{CRG}$ across the capacitor 44, which is a ramp voltage, to generate a pulse signal S2_0.7 with a fixed on-duty of 0.7. The comparator 53 compares the voltage V2 with the charge voltage $V_{CRG}$ across the capacitor 44, which is a ramp voltage, to generate a pulse signal S2_0.5 with a fixed on-duty of 0.5. The comparator 54 compares the voltage V3 with the charge voltage $V_{CRG}$ across the capacitor 44, which is a ramp voltage, to generate a pulse signal S2_0.3 with a fixed on-duty of 0.3.

Figure 14:
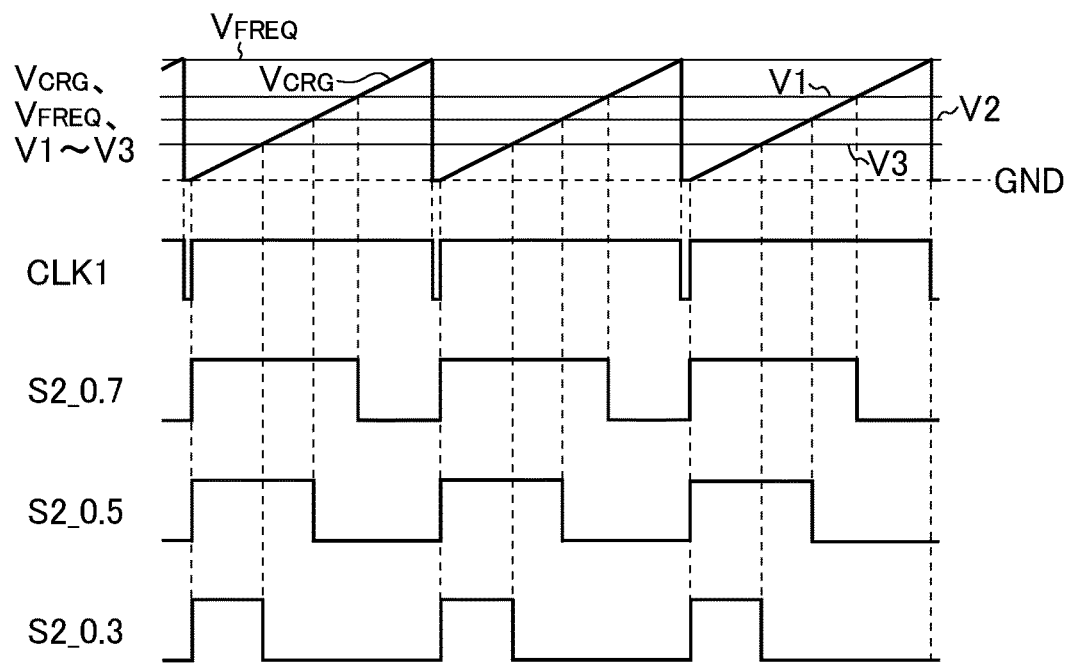
FIG. 14 is a timing chart showing the operation of the fixed-duty circuit and the oscillator shown in FIG. 13.

The clock signal CLK1, which is the output signal of the oscillator 15, and the pulse signals S2_0.7, S2_0.5, and S2_0.3, which are the output signals of the fixed-duty circuit 3 and have fixed on-duties, all have, as shown in a timing chart in FIG. 14, equal frequencies. Thus, the frequency of step-down control signals is equivalent to that of step-up control signals.

The switching regulator according to the third embodiment generates comparatively high-level noise at, and at multiples of, the frequency of step-down control signals and at, and at multiples of, the frequency of step-up control signals. However, the feature that the frequency of step-down control signals is equivalent to that of step-up control signals as mentioned above helps reduce the number of comparatively high-level frequency components. It is thus easy to suppress noise level in a particular frequency band (for example, in a case where the switching regulator is incorporated in a vehicle, in a radio broadcast frequency band).

In the fixed-duty circuit 3 and the oscillator 15 shown in FIG. 13, the fixed-duty circuit 3 sets three fixed values D' of the on-duty, namely 0.7, 0.5, and 0.3. This, however, is merely one example. The configuration of the voltage division circuit composed of the resistors 46 to 50 and the configuration of the comparators 51 to 54 can be modified as appropriate to suit the desired fixed values D'.

The fixed-duty circuit 3 and the oscillator 15 shown in FIG. 13 can be applied not only to a main integrated circuit package that performs feed-forward control on the gradient of the ramp voltage $V_R$ in response to variation of the input voltage $V_{IN}$ but to main integrated circuit packages in general that can be used in step-up/down switching regulators that keep the on-duty of step-up control signals fixed. A main integrated circuit package to which the fixed-duty circuit 3 and the oscillator 15 shown in FIG. 13 are applied can be configured, for example, to use, instead of the ramp voltage $V_R$, a slope voltage with a particular gradient or a slope voltage reflecting information on the inductor L1.

In the switching regulator 102 according to the second embodiment provided with the ramp circuit 13 and the oscillator 15 shown in FIG. 11 or 12, the comparator 27 for generating the clock signal CLK1 is the only comparator to which the charge voltage across the capacitor 26 shown in FIG. 11 or 12 is fed. In the configuration shown in FIG. 11, a circuit for dividing the internal supply voltage $V_{DD}$ (the division voltage $V_B$ of the input voltage $V_{IN}$) and a comparator for generating the pulse signal S2 like those in the configuration shown in FIG. 13 can be additionally provided to obtain effects similar to those obtained with the configuration shown in FIG. 13. In the configuration shown in FIG. 12, a circuit for dividing each of the internal supply voltage $V_{DD}$ (the division voltage $V_B$ of the input voltage $V_{IN}$) and the direct-current voltage $V_A$ and a comparator for generating the pulse signal S2 like those in the configuration shown in FIG. 13 can be additionally provided to obtain effects similar to those obtained with the configuration shown in FIG. 13.

Fourth Embodiment

Figure 15:
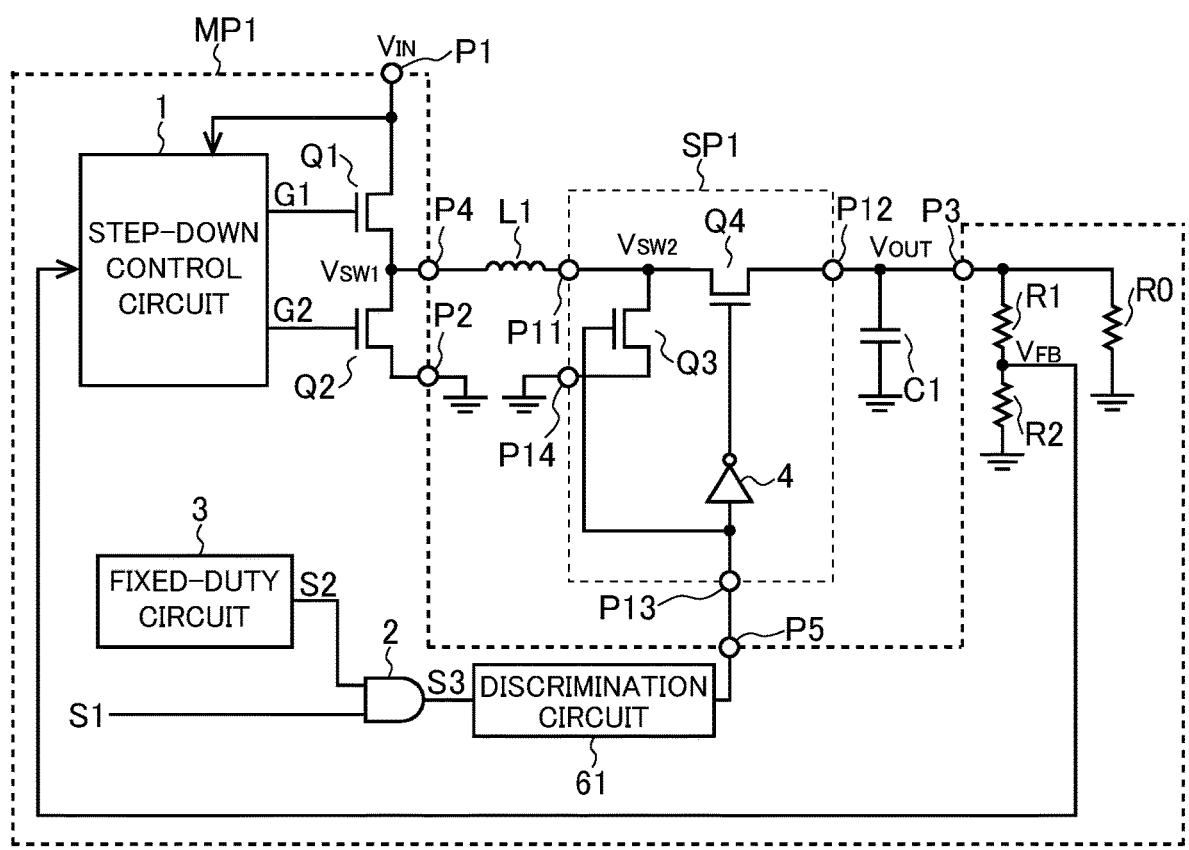
FIG. 15 is a diagram showing an example of the overall configuration of a switching regulator according to a fourth embodiment.

FIG. 15 is a diagram showing an example of the overall configuration of a switching regulator according to a fourth embodiment. The switching regulator 103 shown in FIG. 15, as compared with the switching regulator 101 described previously, further includes a discrimination circuit 61.

Figure 16:
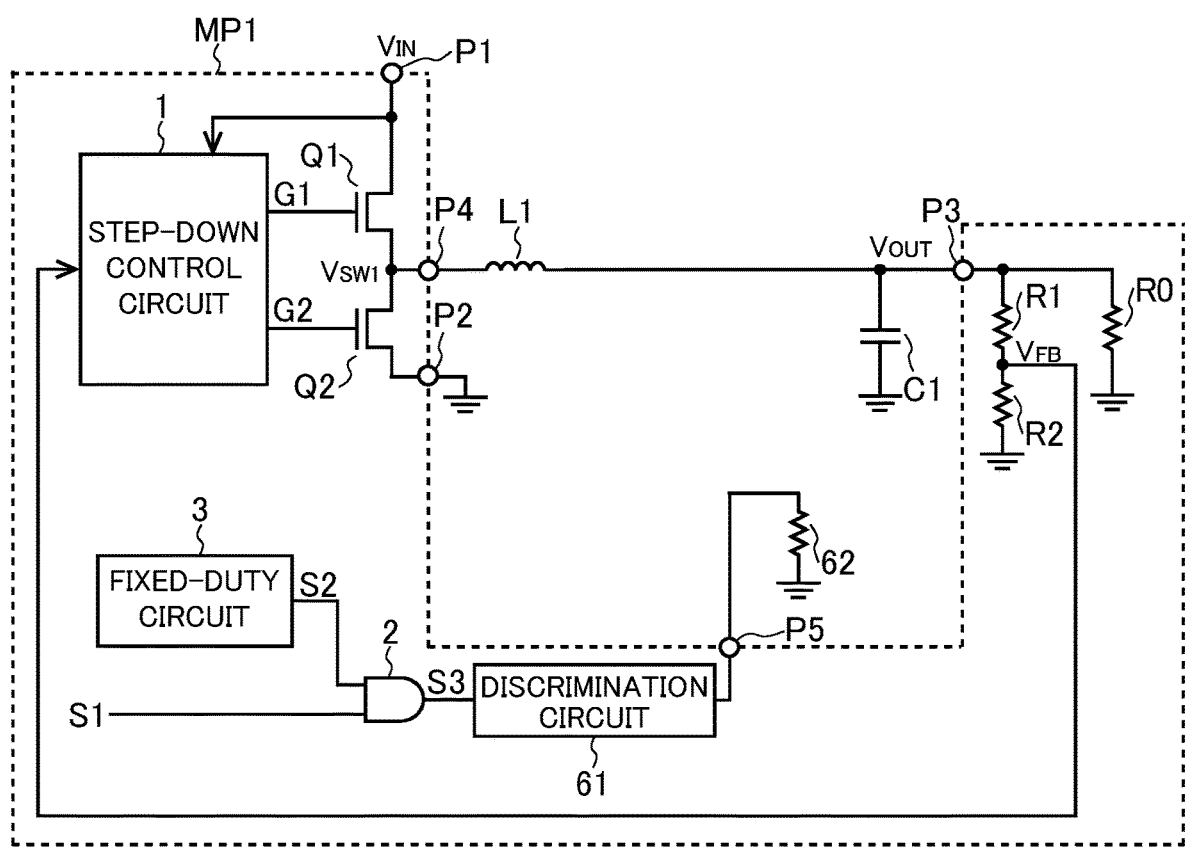
FIG. 16 is a diagram showing an example of the overall configuration of a step-down switching regulator.

The main integrated circuit package MP1 can be used as one component of a step-up/down switching regulator 103 as shown in FIG. 15, and can also be used as one component of a step-down switching regulator 103' as shown in FIG. 16.

A discrimination circuit 61 is included in the main integrated circuit package MP1, and is provided between the AND gate 2 and the fifth external pin P5. The discrimination circuit 61 determines the impedance of an external component that is connected to the external pin P5 and, based on the determined impedance, determines whether the external component is the MOS transistor Q3.

Figure 17:
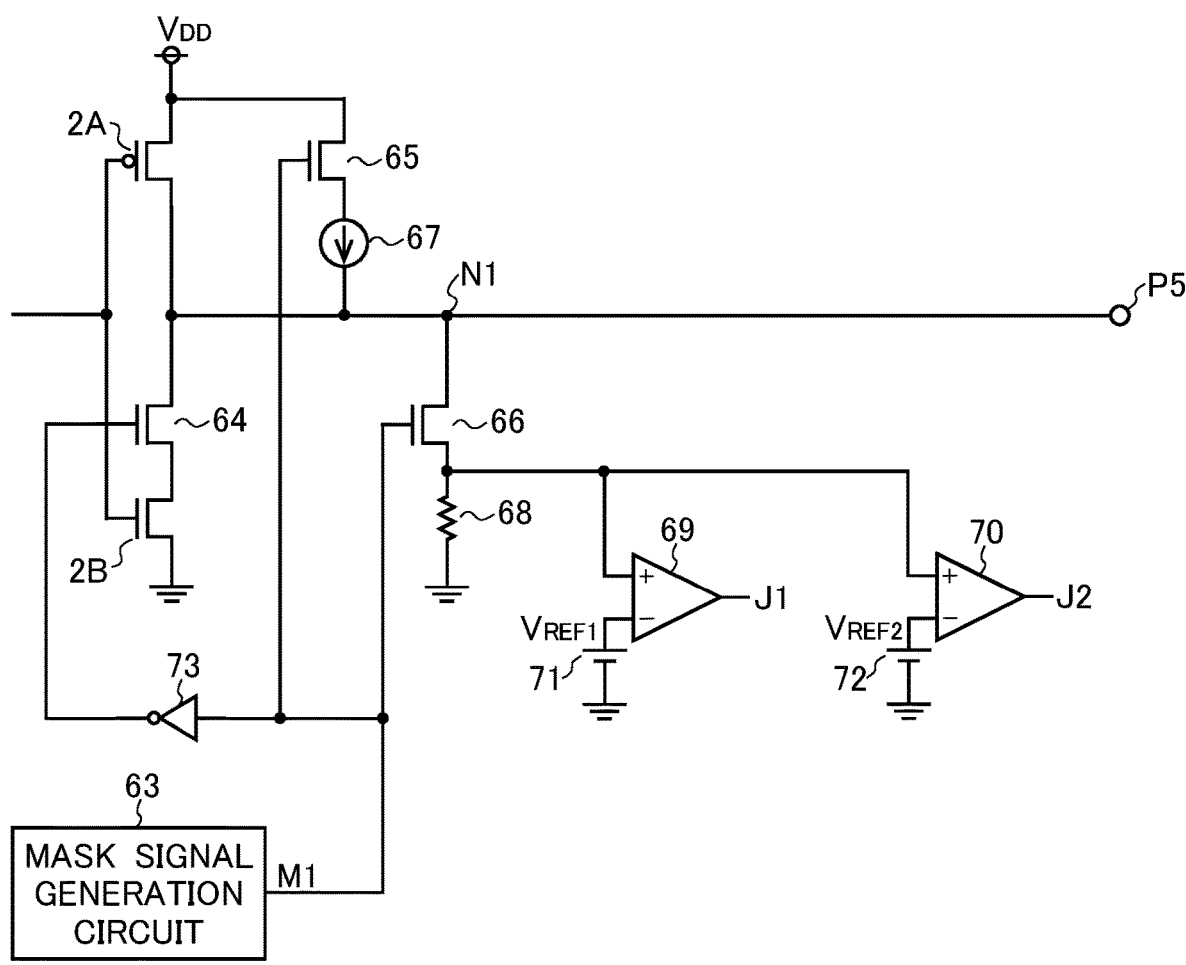
FIG. 17 is a diagram showing one configuration example of a discrimination circuit.

FIG. 17 is a diagram showing one configuration example of the discrimination circuit 61. The discrimination circuit 61 of the configuration example shown in FIG. 17 is composed of a mask signal generation circuit 63, MOS transistors 64 to 66, a constant current source 67, a resistor 68, comparators 69 and 70, reference voltage sources 71 and 72, and a NOT gate 73.

The mask signal generation circuit 63 outputs a high-level mask signal M1 during the period (hereinafter referred to as the mask period) from when the main integrated circuit package MP1 begins to start up, that is, when the main integrated circuit package MP1 turns from a disabled state to an enabled state, until a predetermined period elapses thereafter; after the lapse of the mask period, the mask signal generation circuit 63 outputs a low-level mask signal. After the lapse of the mask period, the step-down control circuit 1 starts to generate the gate signals G1 and G2.

The MOS transistor 64 is controlled by the inversion signal, which is output from the NOT gate 73, of the mask signal M1. The MOS transistor 64 is off during the mask period. Thus, the output level of the output-stage inverter (the inverter composed of the MOS transistors 2A and 2B) is indefinite during the mask period.

The MOS transistor 65 is provided between the terminal to which the internal supply voltage $V_{DD}$ is applied and the constant current source 67, and is controlled by the mask signal M1. The MOS transistor 65 is on during the mask period. Thus, during the mask period, the constant current source 67 feeds a constant current to the connection point N1 between the AND gate 2 and the external pin P5.

The MOS transistor 66 is provided between the connection point N1 and one terminal of the resistor 68, and is controlled by the mask signal M1. The other terminal of the resistor 68 is grounded. The MOS transistor 66 is on during the mask period. Thus, the potential at the connection point N1 during the mask period is determined by the constant current value of the constant current source 67, the resistance value of the resistor 68, and the impedance of the external component connected to the external pin P5.

When, as shown in FIG. 16, the external pin P5 is pulled down via an externally fitted resistor 62 (a resistor with a low resistance value), that means that a low-impedance external component is connected to the external pin P5; thus, the current that passes in the resistor 68 in the mask period is low. Accordingly, the potential at the connection point N1 during the mask period is a low potential.

By contrast, when the external pin P5 is pulled up via an externally fitted resistor, a constant current passes in the resistor 68 during the mask period. Accordingly, the potential at the connection point N1 during mask period is a high potential.

When, as shown in FIG. 15, the gate of the MOS transistor Q3 is connected to the external pin P5, that means that a high-impedance external component is connected to the external pin P5; thus, the current that passes in the resistor 68 during the mask period is high. Accordingly, the potential at the connection point N1 during the mask period is a mid potential higher than the above-mentioned low potential but lower than the above-mentioned high potential.

During the mask period, the comparator 69 compares the potential at the connection point N1 with a first reference voltage $V_{REF1}$ that is output from the reference voltage source 71. The first reference voltage $V_{REF1}$ is set at such a value as to permit determination of whether the potential at the connection point N1 equals the above-mentioned low potential.

During the mask period, the comparator 70 compares the potential at the connection point N1 with a second reference voltage $V_{REF2}$ that is output from the reference voltage source 72. The second reference voltage $V_{REF2}$ is set at such a value as to permit determination of whether the potential at the connection point N1 equals the above-mentioned high potential.

The output signal J1 of the comparator 69 and the output signal J2 of the comparator 70 are signals that indicate the result of the determination of the external component.

If the output signal J1 of the comparator 69 and the output signal J2 of the comparator 70 are both at high level, that indicates that a pull-up resistor is connected. If the output signal J1 of the comparator 69 is at high level and the output signal J2 of the comparator 70 is at low level, that indicates that the MOS transistor Q3 is connected. If the output signal J1 of the comparator 69 and the output signal J2 of the comparator 70 are both at low level, that indicates that a pull-down resistor is connected.

In this embodiment, it is previously so arranged that, in a case where the main integrated circuit package MP1 is used as one component of a step-down switching regulator, a pull-down resistor is connected to the external pin P5 and, in a case where the main integrated circuit package MP1 is operated in a test mode, a pull-up resistor is connected to the external pin P5. The arrangements can be stated in a data sheet or a manual of the main integrated circuit package MP1. A configuration without a test mode is also possible. Omitting the test mode eliminates the need for the comparator 70 and the reference voltage source 72.

While there is no particular restriction on how to use the result of the determination by the discrimination circuit 61, one possible way of using it will now be described.

When the output signal J1 of the comparator 69 and the output signal J2 of the comparator 70 are both at low level, the supply of electric power to the AND gate 2 and the fixed-duty circuit 3 is stopped. This helps reduce power consumption when the main integrated circuit package MP1 is used as one component of a step-down switching regulator.

By contrast, when the output signal J1 of the comparator 69 and the output signal J2 of the comparator 70 are both at high level, or when the output signal J1 of the comparator 69 is at high level and the output signal J2 of the comparator 70 is at low level, the supply of electric power to the AND gate 2 and the fixed-duty circuit 3 is not stopped.

When the output signal J1 of the comparator 69 is at high level and the output signal J2 of the comparator 70 is at low level, the following control is possible: during the start-up of the main integrated circuit package MP1, if the input voltage $V_{IN}$ is lower than a first threshold value, the operation of the step-down control circuit 1 can be inhibited and, if the input voltage $V_{IN}$ is lower than a second threshold value larger than the first threshold value, the operation of the AND gate 2 and the fixed-duty circuit 3 can be inhibited.

At the start-up of the main integrated circuit package MP1, the output capacitor C1 is not charged; thus, when the main integrated circuit package MP1 starts up in the step-up/down mode, the step-up/down switching regulator may yield an excessively high output current. To avoid that, in a case where the main integrated circuit package MP1 is used as one component of a step-up/down switching regulator, it is preferable to first inhibit the operation of the step-down control circuit 1, the AND gate 2, and the fixed-duty circuit 3 mentioned above and then start up the main integrated circuit package MP1 in the step-down mode.

The discrimination circuit 61 shown in FIG. 15 can be applied not only to a main integrated circuit package that performs feed-forward control on the gradient of the ramp voltage $V_R$ in response to variation of the input voltage $V_{IN}$ but to main integrated circuit packages in general that can be used in step-up/down switching regulators that keep the on-duty of step-up control signals fixed. A main integrated circuit package to which the discrimination circuit 61 shown in FIG. 15 is applied can be configured, for example, to use, instead of the ramp voltage $V_R$, a slope voltage with a particular gradient or a slope voltage reflecting information on the inductor L1.

Fifth Embodiment

Figure 18:
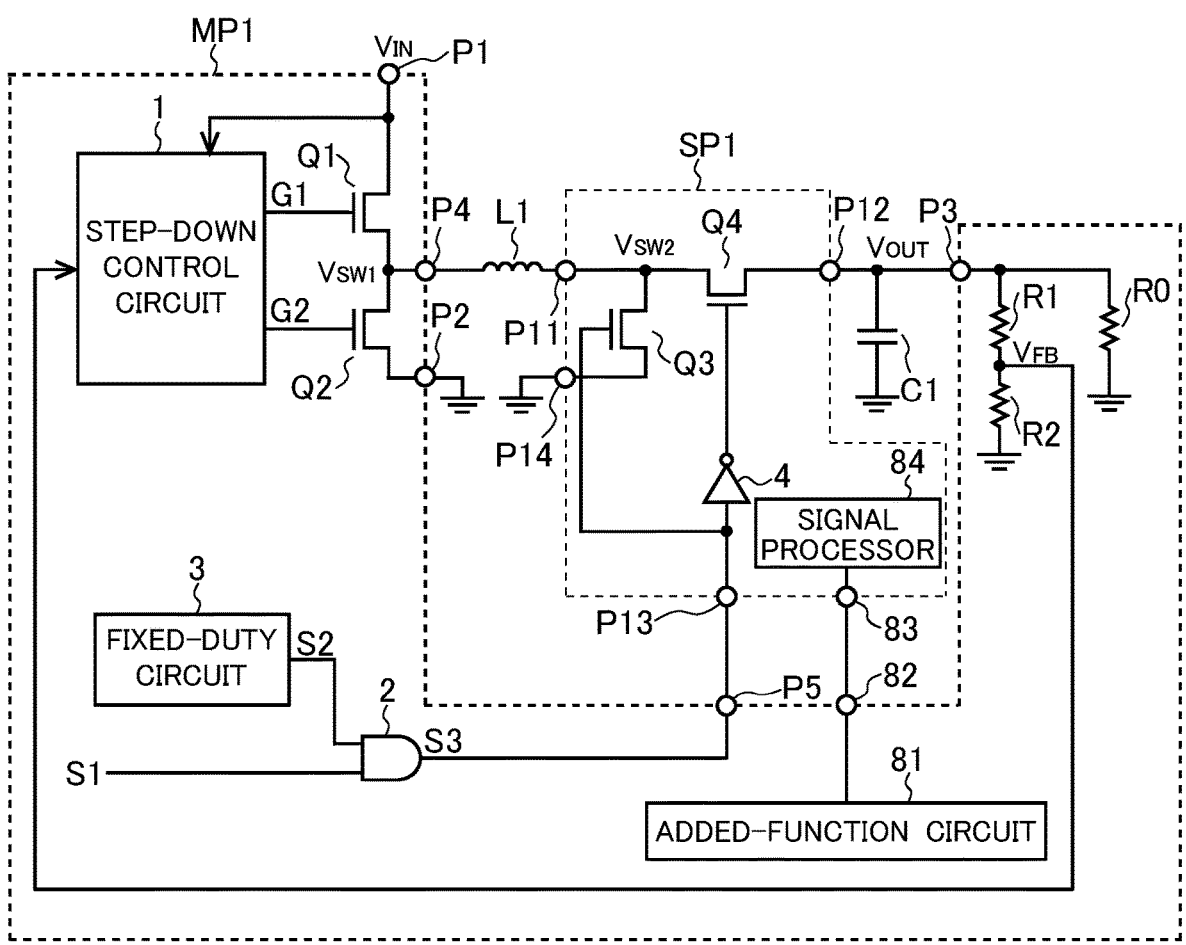
FIG. 18 is a diagram showing an example of the overall configuration of a switching regulator according to a fifth embodiment.

FIG. 18 is a diagram showing an example of the overall configuration of a switching regulator according to a fifth embodiment. The switching regulator 104 shown in FIG. 18, as compared with the switching regulator 101 described previously, further includes an added-function circuit 81, external pins 82 and 83, and a signal processor 84.

The added-function circuit 81 and the external pin 82 are included in the main integrated circuit package MP1. The added-function circuit 81 and the external pin 82 are connected together within the main integrated circuit package MP1.

The external pin 83 and the signal processor 84 are included in the sub integrated circuit package SP1. The external pin 83 and the signal processor 84 are connected together within the sub integrated circuit package SP1.

In the switching regulator 104, the external pins 82 and 83 are connected together. The added-function circuit 81 provides an additional function by using a signal that is output from the external pin 82 to the signal processor 84 or a signal fed from the signal processor 84 to the external pin 82.

Figure 19:
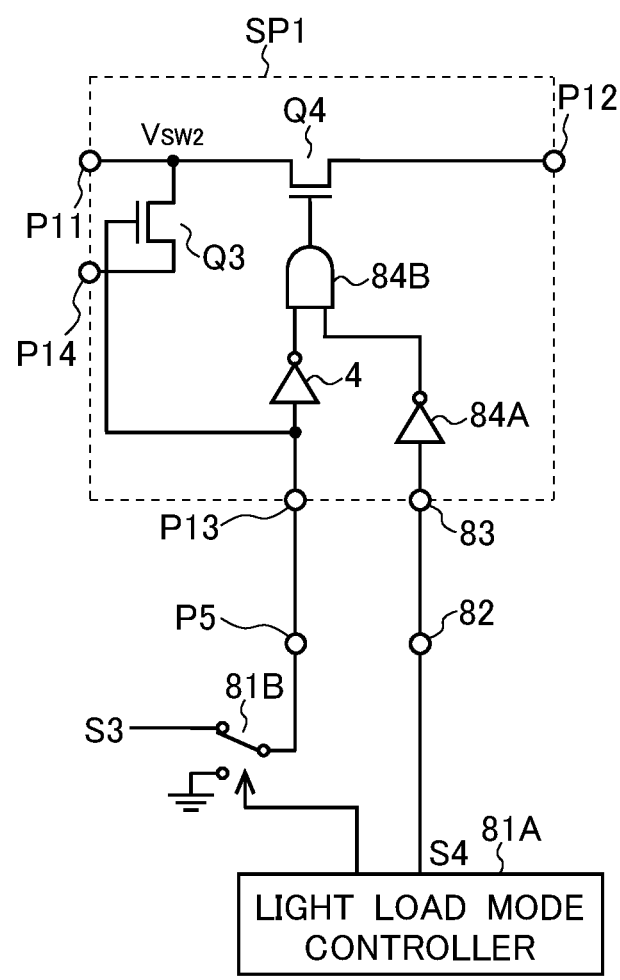
FIG. 19 is a diagram showing one configuration example of an added-function circuit and a signal processor.

FIG. 19 is a diagram showing one configuration example of the added-function circuit 81 and the signal processor 84. In the configuration example shown in FIG. 19, the added-function circuit 81 is composed of a light-load mode controller 81A and a switch 81B, and the signal processor 84 is composed of a NOT gate 84A and an AND gate 84B.

The light-load mode controller 81A includes a reverse current detector which detects a reverse current that passes in the MOS transistor Q2 (a current passing from the external pin P4 to the external pin P2). Usable as the reverse current detector is a comparator of which the first input terminal is connected to the source of the MOS transistor Q2 and of which the second input terminal is connected to the drain of the MOS transistor Q2.

When a reverse current passing in the MOS transistor Q2 is detected, the light-load mode controller 81A recognizes that a light-load mode is in effect.

On recognizing that the light-load mode is in effect, the light-load mode controller 81A so controls the step-down control circuit 1 as to stop the switching operation by the MOS transistors Q1 and Q2, and turns the MOS transistors Q1 and Q2 both off.

Moreover, on recognizing that the light-load mode is in effect, the light-load mode controller 81A so controls the switch 81B as to make it select the ground potential, and turns the external pin P5 to low level. Thus, the MOS transistor Q3 turns off.

Furthermore, on recognizing that the light-load mode is in effect, the light-load mode controller 81A turns a control signal S4 that is fed to the external pin 82 to high level. As a result, via the NOT gate 84A and the AND gate 84B, the signal fed to the gate of the MOS transistor Q4 turns to low level, and the MOS transistor Q4 turns off.

With the signal S3 alone, it is possible only to turn on and off the MOS transistors Q3 and Q4 complementarily; introducing the control signal S4 makes it possible to turn the MOS transistors Q1 to Q4 all off in the light-load mode as mentioned above. It is thus possible to save electric power in the light-load mode. If, with the MOS transistors Q1 to Q4 all off under the control of the light-load mode controller 81A, the output voltage $V_{OUT}$ becomes lower than a predetermined value, the light-load mode controller 81A performs control opposite to that which it performs on recognizing the light-load mode, and thereby cancels the control in the light-load mode.

Simply turning the external pin P5 to low level without introducing the control signal S4 may turn off the MOS transistors Q1 to Q3 but leaves the MOS transistor Q4 on, resulting in a problem: in the light-load mode, a current passes reversely from the output voltage $V_{OUT}$ application terminal to the MOS transistor Q4 to the body diode of the MOS transistor Q1 to the input voltage $V_{IN}$ application terminal.

On the other hand, the control signal S4 is at low level when the light-load mode is not in effect. Accordingly, in a case where the function of turning the MOS transistors Q1 to Q4 all off is not used, the external pins 82 and 83 can be grounded.

Figure 20:
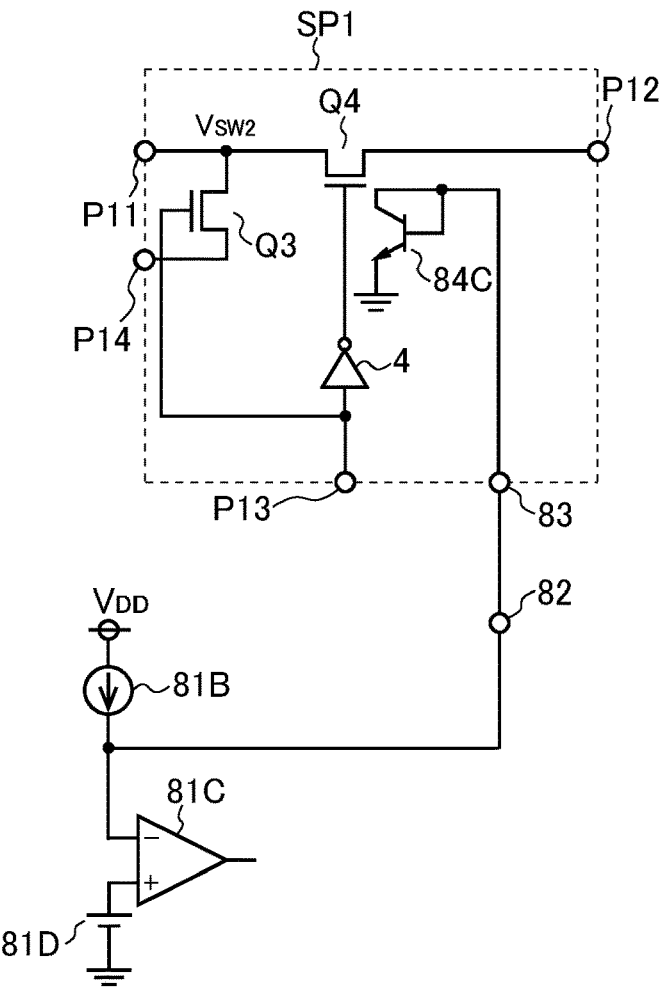
FIG. 20 is a diagram showing another configuration example of an added-function circuit and a signal processor.

FIG. 20 is a diagram showing another configuration example of the added-function circuit 81 and the signal processor 84. In the configuration example shown in FIG. 20, the added-function circuit 81 is composed of a constant current source 81B, a comparator 81C, and a reference voltage source 81D, and the signal processor 84 is composed of a bipolar transistor 84C.

The constant current output from the constant current source 81B is fed via the external pins 82 and 83 to the bipolar transistor 84C. The collector and the base of the bipolar transistor 84C, which is of an npn type, are connected to the external pin 82, and the emitter of the bipolar transistor 84C is grounded; thus, the base-emitter voltage in the bipolar transistor 84C appears at the external pins 82 and 83.

The base-emitter voltage in the bipolar transistor 84C has negative temperature characteristics. Accordingly, with the configuration shown in FIG. 20 where the inverting input terminal of the comparator 81C and the external pin 82 are connected together and the reference voltage output from the reference voltage source 81D is fed to the non-inverting input terminal of the comparator 81C, when the bipolar transistor 84C is in an overheated state, the output signal of the comparator 81C is at high level, and when the bipolar transistor 84C is not in an overheated state, the output signal of the comparator 81C is at low level. When the output signal of the comparator 81C is at high level, the main integrated circuit package MP1 performs thermal shutdown operation (switching control halt). As a result, the bipolar transistor 84C, and hence the sub integrated circuit package SP1, is relieved from the overheated state. It is preferable that the bipolar transistor 84C be arranged near the MOS transistor Q4, which is likely to go into an overheated state within the sub integrated circuit package SP1. As in the case shown in FIG. 16, in a case where the main integrated circuit package MP1 according to this embodiment is used as one component of a step-down switching regulator 104, the operation of the added-function circuit 81 is unnecessary. Accordingly, the discrimination circuit 61 included in the main integrated circuit package MP1 in the fourth embodiment can be used also in this embodiment, in which case the result of the determination by the discrimination circuit 61 can be used in the following manner. If the result of the determination by the discrimination circuit 61 indicates that the MOS transistor Q3 is connected to the external pin P5, the added-function circuit 81 is operated; on the other hand, if the result of the determination by the discrimination circuit 61 indicates that the MOS transistor Q3 is not connected to the external pin P5, the operation of the added-function circuit 81 is stopped. In one specific example of the circuit configuration, a switch is provided between the internal supply voltage $V_{DD}$ application terminal and the constant current source 81B, and the switch is turned on and off in accordance with the result of the determination by the discrimination circuit 61.

Figure 21:
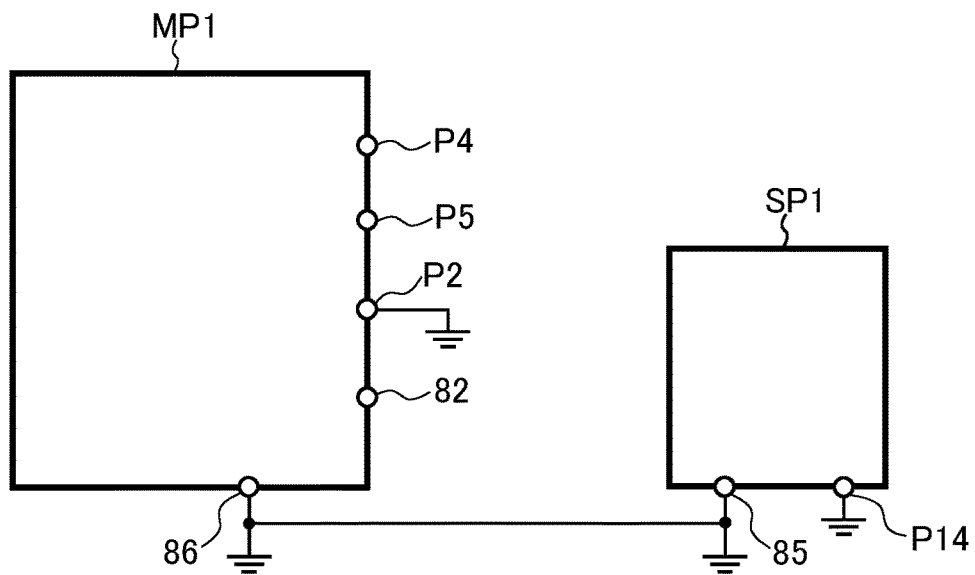
FIG. 21 is a diagram showing an example of the arrangement of external pins in the fifth embodiment.

FIG. 21 is a diagram showing an example of the arrangement of external pins in the fifth embodiment.

In the main integrated circuit package MP1, the external pin P2, which is grounded, is arranged between the external pin P5 and the external pin 82. Thus, a signal output from the external pin 82, or a signal input to the external pin 82, is less susceptible to the influence of the signal S3, which is a high-frequency signal. This helps enhance the reliability of the added function. Likewise, in the main integrated circuit package MP1, the external pin P2, which is grounded, is arranged between the external pin P4 and the external pin 82. Thus, a signal output from the external pin 82, or a signal input to the external pin 82, is less susceptible to the influence of a switching voltage $V_{SW1}$, which is a high-frequency signal. This helps enhance the reliability of the added function.

Though omitted from the description of the embodiments given above, gate drivers are typically provided in the stage preceding the gates of the MOS transistors Q1 to Q4. The sub integrated circuit package SP1 is provided with an external pin 85 and, within the sub integrated circuit package SP1, the ground terminal of a gate driver for the MOS transistor Q3 and the ground terminal of a gate driver for the MOS transistor Q4 are connected to the external pin 85. The main integrated circuit package MP1 is provided with an external pin 86 and, within the main integrated circuit package MP1, the grounded terminal of a gate driver for the MOS transistor Q1 and the grounded terminal of a gate driver for the MOS transistor Q2 are connected to the external pin 86.

The external pins 85 and 86 are connected to a common ground, and the ground for the external pins 85 and 86 is isolated from the ground for the external pin P14. This makes the ground levels in all the gate drivers equal, and suppresses variation of the ground potential in those gate drivers resulting from a current passing in the MOS transistor Q3. It is thus possible to enhance the reliability of the switching control of the MOS transistors Q1 to Q4.

Moreover, the supply voltage terminal of the gate driver for the MOS transistor Q3 and the supply voltage terminal of the gate driver for the MOS transistor Q4 are connected, within the sub integrated circuit package SP1, to the external pin P12. That is, the output voltage $V_{OUT}$ is used as the supply voltage for the gate drivers for the MOS transistors Q3 and Q4. This eliminates the need to provide the sub integrated circuit package SP1 with an external pin for input of a supply voltage, and thus helps reduce the number of external pins on the sub integrated circuit package SP1.

The added-function circuit 81 shown in FIG. 18 can be applied not only to a main integrated circuit package that performs feed-forward control on the gradient of the ramp voltage $V_R$ in response to variation of the input voltage $V_{IN}$ but also to main integrated circuit packages in general that can be used in step-up/down switching regulators that keep the on-duty of step-up control signals fixed. A main integrated circuit package to which the added-function circuit 81 shown in FIG. 18 is applied can be configured, for example, to use, instead of the ramp voltage $V_R$, a slope voltage with a particular gradient or a slope voltage reflecting information on the inductor L1.

<Application>

Figure 22:
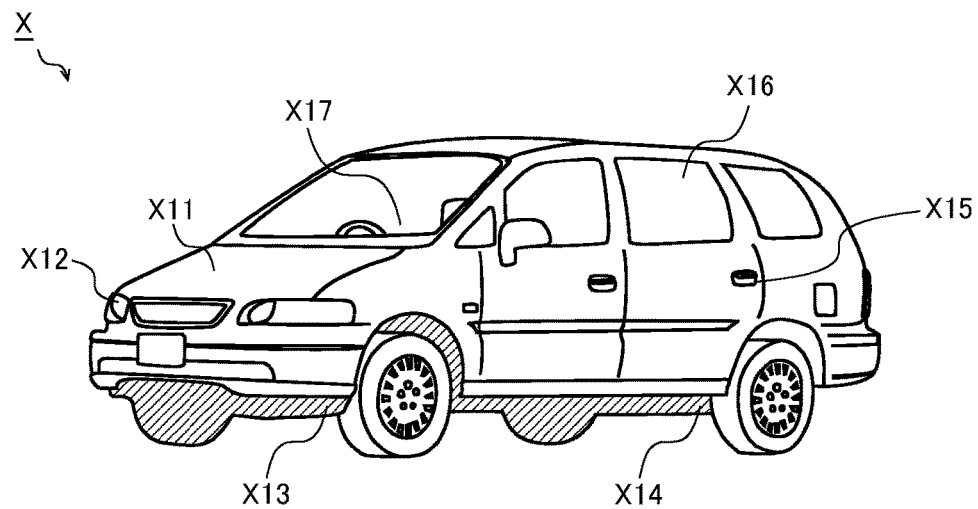
FIG. 22 is an exterior view showing one configuration example of a vehicle incorporating vehicle-mounted equipment.

Next, an example of application of the switching regulators described previously will be described. FIG. 22 is an exterior view showing one configuration example of a vehicle incorporating vehicle-mounted equipment. The vehicle X of this configuration example incorporates a battery (unillustrated), a primary switching regulator (unillustrated) fed with a direct-current voltage supplied from the battery, a secondary switching regulator (unillustrated) fed with a direct-current voltage output from the primary switching regulator, and vehicle-mounted appliances X11 to X17. Any of the switching regulators described previously can be applied to, for example, the primary switching regulator.

The vehicle-mounted appliances X11 to Z17 each use either of the output voltages of the primary and secondary switching regulators.

The vehicle-mounted appliance X11 is an engine control unit which performs control with respect to an engine (injection control, electronic throttle control, idling control, oxygen sensor heater control, automatic cruise control, etc.).

The vehicle-mounted appliance X12 is a lamp control unit which controls the lighting and extinguishing of HIDs (high-intensity discharged lamps) and DRLs (daytime running lamps).

The vehicle-mounted appliance X13 is a transmission control unit which performs control with respect to a transmission.

The vehicle-mounted appliance X14 is a body control unit which performs control with respect to the movement of the vehicle X (ABS (anti-lock brake system) control, EPS (electric power steering) control, electronic suspension control, etc.).

The vehicle-mounted appliance X15 is a security control unit which drives and controls door locks, burglar alarms, and the like.

The vehicle-mounted appliance X16 comprises electronic devices incorporated in the vehicle X as standard or manufacturer-fitted equipment at the stage of factory shipment, such as wipers, power side mirrors, power windows, a power sun roof, power seats, and an air conditioner.

The vehicle-mounted appliance X17 comprises electronic devices fitted to the vehicle X optionally as user-fitted equipment, such as AN (audio/visual) equipment, a car navigation system, and an ETC (electronic toll control system).

<Modifications>

The invention disclosed herein may be implemented in any other manner than as in the embodiments described above, and allows for many modifications without departing from the spirit of the present invention. For example, although the fifth embodiment mentions power-saving control in the light-load mode and an overheat protection function as examples of the added function, any other function may instead be implemented. That is, the embodiments described above should be understood to be in every aspect illustrative and not restrictive. The technical scope of the present invention is defined not by the description of the embodiments given above but by the appended claims, and should be understood to encompass any modifications made in the sense and scope equivalent to those of the claims.

INDUSTRIAL APPLICABILITY

The present invention finds application in step-up/down switching regulators used in any fields (such as in the fields of household appliances, automobiles, and industry machinery).

LIST OF REFERENCE SIGNS 1 step-down control circuit
2 AND gate
3 fixed-duty circuit
4, 73 NOT gate
11 error amplifier
12, 71, 72, 81D reference voltage source
13 ramp circuit
14, 27, 51-54, 69, 70, 81C comparator
15 oscillator
16 timing control circuit
21 voltage division circuit
22, 34 voltage-current conversion circuit
23 current mirror circuit
31 duty conversion circuit
32 level shifter
33 low-pass filter
36, 37, 81B switch
38 counter
61 discrimination circuit
63 mask signal generation circuit
67, 81B constant-current source
81 added-function circuit
81A light-load mode controller
84 signal processor
84A NOT gate
84B AND gate
84C bipolar transistor
101-104 switching regulator
C1 output capacitor
C2-C5, 26, 44 capacitor
L1 inductor
MP1 main integrated circuit package
P1-P7, P11-P14, 82, 83, 85, 86 external pin
Q1-Q11, 24, 25, 42, 43, 45, 64-66, 2A, 2B MOS transistor
R0 output resistor
R1, R2 voltage division resistor
R3, R4, 35, 41, 46-50, 68 resistor
$R_C$, 62 externally fitted resistor
SP1 sub integrated circuit package
X vehicle
X11-X17 vehicle-mounted appliance

The invention claimed is:

1. An integrated circuit package, comprising:
a first external pin to which an input voltage is applied;
a second external pin to which a predetermined voltage lower than the input voltage is applied;
a third external pin to which a feedback voltage is applied;
a first switch of which a first terminal is connected to the first external pin;
a second switch
of which a first terminal is connected to a second terminal of the first switch and
of which a second terminal is connected to the second external pin;
a fourth external pin connected to a connection node between the first and second switches;
a first control circuit configured to generate a step-down control signal for turning on and off the first and second switches complementarily in accordance with the feedback voltage;
a second control circuit configured to generate a pulse signal of which an on-duty D (0≤D≤1) is fixed at a fixed value D' (0<D'<1) in a step-up/down mode;
a fifth external pin from which the pulse signal is output in the step-up/down mode; and
a discriminator configured to determine an impedance of an external component connected to the fifth external pin and, based on the determined impedance, determine whether the external component is a third switch.

2. The integrated circuit package according to claim 1, wherein
at start-up of the integrated circuit package, the discriminator determines whether the external component is the third switch, and
on completion of the determination by the discriminator, the first control circuit starts to generate the step-down control signal.

3. The integrated circuit package according to claim 2, wherein
at the start-up of the integrated circuit package, when the discriminator determines that the external component is the third switch,
if the input voltage is lower than a first threshold value, operation of the first control circuit is inhibited, and
if the input voltage is lower than a second threshold value larger than the first threshold value, operation of the second control circuit is inhibited.

4. The integrated circuit package according to claim 1, wherein the second control circuit
operates when the discriminator determines that the external component is the third switch and
does not operate when the discriminator determines that the external component is not the third switch.

5. The integrated circuit package according to claim 4, wherein
the discriminator determines whether the fifth external pin is pulled up, and
when the discriminator determines that the fifth external pin is pulled up, even if the discriminator determines that the external component is not the third switch, the second control circuit operates exceptionally.

6. The integrated circuit package according to claim 1, wherein during a period in which the discriminator is determining whether the external component is the third switch, the discriminator
keeps an output level of the second control circuit indefinite,
feeds a constant current to a connection point between the second control circuit and the fifth external pin, and
determines the impedance of the external component based on a potential at the connection point between the second control circuit and the fifth external pin.

7. A switching regulator, comprising:
the integrated circuit package according to claim 1; and
an inductor connected to the fourth external pin.

8. A vehicle, comprising:
the switching regulator according to claim 7; and
a battery that supplies the switching regulator with electric power.

9. A switching regulator that generates an output voltage from an input voltage, comprising:

a first switch of which a first terminal is connected to an application terminal of the input voltage;

a second switch
of which a first terminal is connected to a second terminal of the first switch and
of which a second terminal is connected to an application terminal of a predetermined voltage lower than the input voltage;

an inductor of which a first terminal is connected to a connection node between the first and second switches;

a third switch
of which a first terminal is connected to a second terminal of the inductor and
of which a second terminal is connected to the application terminal of the predetermined voltage;

a fourth switch
of which a first terminal is connected to a connection node between the inductor and the third switch and
of which a second terminal is connected to an application terminal of the output voltage;

a first control circuit configured to generate a step-down control signal for turning on and off the first and second switches complementarily in accordance with the output voltage; and a second control circuit configured to generate a step-up control signal for turning on and off the third and fourth switches complementarily while keeping an on-duty D ($0 \leq D \leq 1$) of the third switch fixed at a fixed value D' ($0 < D' < 1$) in a step-up/down mode, wherein the first and second control circuits each includes a ramp voltage generator configured to generate a ramp voltage with a gradient commensurate with an internal supply voltage, the first control circuit includes a first comparator that compares a first division voltage of the internal supply voltage with the ramp voltage of the first control circuit, the second control circuit includes a second comparator that compares a second division voltage of the internal supply voltage with the ramp voltage of the second control circuit, the first control circuit generates the step-down control signal with a frequency equal to a frequency of an output signal of the first comparator; and the second control circuit takes an output signal of the second comparator as the step-up control signal.

10. The switching regulator according to claim 9, wherein the second comparator comprises a plurality of second comparators, and second division voltages of the internal supply voltage that are fed to the plurality of second comparators respectively have values different from each other.

11. The switching regulator according to claim 9, wherein the ramp voltage generator includes:
a current generator configured to generate a current commensurate with the internal supply voltage; and
a capacitor charged by an output current of the current generator.

12. The switching regulator according to claim 11, wherein the ramp voltage generator further includes a charge switch that switches between a conducting state and a cut-off state of a current path from an output terminal of the current generator to the capacitor.

13. The switching regulator according to claim 11, wherein the ramp voltage generator includes a resetter configured to discharge the capacitor to reset a charge voltage across the capacitor.

14. A switching regulator that generates an output voltage from an input voltage, comprising:
a first switch of which a first terminal is connected to an application terminal of the input voltage;

a second switch
of which a first terminal is connected to a second terminal of the first switch and
of which a second terminal is connected to an application terminal of a predetermined voltage lower than the input voltage;

an inductor of which a first terminal is connected to a connection node between the first and second switches;

a third switch
of which a first terminal is connected to a second terminal of the inductor and of which a second terminal is connected to the application terminal of the predetermined voltage;

a fourth switch
of which a first terminal is connected to a connection node between the inductor and the third switch and
of which a second terminal is connected to an application terminal of the output voltage;

a first control circuit configured to generate a step-down control signal for turning on and off the first and second switches complementarily in accordance with the output voltage; and a second control circuit configured to generate a step-up control signal for turning on and off the third and fourth switches complementarily while setting an on-duty of the third switch independently of either of the output voltage and the input voltage in a step-up/down mode, wherein the first control circuit includes a first comparator that compares a first division voltage of an internal supply voltage with a ramp voltage of the first control circuit, the second control circuit includes a second comparator that compares a second division voltage of the internal supply voltage with a ramp voltage of the second control circuit, the first control circuit generates the step-down control signal with a frequency equal to a frequency of an output signal of the first comparator; and the second control circuit takes an output signal of the second comparator as the step-up control signal.

15. An integrated circuit package, comprising:
a first external pin to which an input voltage is applied;
a second external pin to which a predetermined voltage lower than the input voltage is applied;
a third external pin to which a feedback voltage is applied,
a first switch of which a first terminal is connected to the first external pin;
a second switch
of which a first terminal is connected to a second terminal of the first switch and
of which a second terminal is connected to the second external pin;
a fourth external pin connected to a connection node between the first and second switches;
a first control circuit configured to generate a step-down control signal for turning on and off the first and second switches complementarily in accordance with the feedback voltage;
a second control circuit configured to generate a pulse signal of which an on-duty D ($0 \leq D \leq 1$) is fixed at a fixed value D' ($0 < D' < 1$) in a step-up/down mode; and
a fifth external pin from which the pulse signal is output in the step-up/down mode, wherein the first and second control circuits each includes a ramp voltage generator configured to generate a ramp voltage with a gradient commensurate with an internal supply voltage, the first control circuit includes a first comparator that compares a first division voltage of the internal supply voltage with the ramp voltage of the first control circuit, the second control circuit includes a second comparator that compares a second division voltage of the internal supply voltage with the ramp voltage of the second control circuit, the first control circuit generates the step-down control signal with a frequency equal to a frequency of an output signal of the first comparator; and the second control circuit takes an output signal of the second comparator as the pulse signal.

* * * * *